(12) United States Patent
Chou et al.

(10) Patent No.: US 11,237,113 B2
(45) Date of Patent: Feb. 1, 2022

(54) RAPID PH MEASUREMENT

(71) Applicant: Essenlix Corporation, Monmouth Junction, NJ (US)

(72) Inventors: Stephen Y. Chou, Princeton, NJ (US); Wei Ding, East Windsor, NJ (US); Yuecheng Zhang, Yardley, PA (US)

(73) Assignee: Essenlix Corporation, Monmouth Junction, NJ (US)

( * ) Notice: Subject to any disclaimer, the term of this patent is extended or adjusted under 35 U.S.C. 154(b) by 155 days.

(21) Appl. No.: 16/172,472

(22) Filed: Oct. 26, 2018

(65) Prior Publication Data

US 2019/0128816 A1 May 2, 2019

Related U.S. Application Data

(60) Provisional application No. 62/577,424, filed on Oct. 26, 2017.

(51) Int. Cl.
| | |
|---|---|
| *G01N 21/80* | (2006.01) |
| *G06T 7/00* | (2017.01) |
| *G06T 7/90* | (2017.01) |
| *H04B 1/3888* | (2015.01) |
| *G06K 9/00* | (2006.01) |
| *G01N 21/77* | (2006.01) |
| *G01N 21/03* | (2006.01) |

(52) U.S. Cl.
CPC ......... *G01N 21/80* (2013.01); *G06K 9/00134* (2013.01); *G06T 7/0012* (2013.01); *G06T 7/90* (2017.01); *H04B 1/3888* (2013.01); *G01N 2021/036* (2013.01); *G01N 2021/0325* (2013.01); *G01N 2021/7796* (2013.01); *G06T 2207/20081* (2013.01); *G06T 2207/30024* (2013.01)

(58) Field of Classification Search
CPC ............ G01N 21/80; G01N 2021/036; G01N 2021/0325; G01N 2021/7796; G06T 7/0012; G06T 7/90; G06T 2207/20081; G06T 2207/30024; H04B 1/3888; G06K 9/00134
See application file for complete search history.

(56) References Cited

U.S. PATENT DOCUMENTS

| | | |
|---|---|---|
| 3,368,872 A | 2/1968 | Natelson |
| 3,447,863 A | 6/1969 | Patterson |
| 3,895,661 A | 7/1975 | Praglin et al. |

(Continued)

FOREIGN PATENT DOCUMENTS

| | | |
|---|---|---|
| AU | 198813789 A | 9/1988 |
| AU | 619459 B | 1/1992 |

(Continued)

OTHER PUBLICATIONS

Van Vliet, Dillys et al., Prediction of asthma exacerbations in children by innovative exhaled inflammatory markers: Results of a longitudinal study, PLOS ONE, Mar. 23, 2015.

(Continued)

*Primary Examiner* — Dennis White

(57) ABSTRACT

Among other things, certain embodiments of the present disclosure are related to devices and methods of performing biological and chemical assays, such as but not limited to pH measurement of bio/chemical samples.

35 Claims, 3 Drawing Sheets

(56) References Cited

U.S. PATENT DOCUMENTS

| | | | |
|---|---|---|---|
| 3,925,166 A | 12/1975 | Blume | |
| 3,992,158 A | 11/1976 | Przybylowicz et al. | |
| 4,022,521 A * | 5/1977 | Hall | G02B 21/34 |
| | | | 359/398 |
| 4,066,412 A | 1/1978 | Johnson et al. | |
| 4,088,448 A | 5/1978 | Lilja et al. | |
| 4,171,866 A | 10/1979 | Tolles | |
| 4,233,029 A | 11/1980 | Columbus | |
| 4,255,384 A | 3/1981 | Kitajima et al. | |
| 4,258,001 A | 3/1981 | Pierce et al. | |
| 4,329,054 A | 5/1982 | Bachalo | |
| 4,402,614 A | 9/1983 | Porath | |
| 4,427,294 A | 1/1984 | Pietro | |
| 4,430,436 A | 2/1984 | Koyama et al. | |
| 4,596,695 A | 6/1986 | Cottingham | |
| 4,745,075 A | 5/1988 | Hadfield et al. | |
| 4,806,311 A | 2/1989 | Greenquist | |
| 4,883,642 A | 11/1989 | Bisconte | |
| 4,906,439 A | 3/1990 | Grenner | |
| 4,911,782 A | 3/1990 | Brown | |
| 4,950,455 A | 8/1990 | Smith | |
| 5,002,736 A | 3/1991 | Babbitt et al. | |
| 5,039,487 A | 8/1991 | Smith | |
| 5,096,836 A | 3/1992 | Macho et al. | |
| 5,122,284 A | 6/1992 | Braynin et al. | |
| 5,132,097 A | 7/1992 | Van Deusen et al. | |
| 5,169,601 A | 12/1992 | Ohta et al. | |
| 5,188,968 A | 2/1993 | Kano et al. | |
| 5,223,219 A | 6/1993 | Subramanian et al. | |
| 5,281,540 A | 1/1994 | Merkh et al. | |
| 5,306,467 A | 4/1994 | Douglas-Hamilton et al. | |
| 5,321,975 A | 6/1994 | Wardlaw | |
| 5,362,648 A | 11/1994 | Koreyasu et al. | |
| 5,413,732 A | 5/1995 | Buhl et al. | |
| 5,427,959 A | 6/1995 | Nishimura et al. | |
| 5,431,880 A | 7/1995 | Kramer | |
| 5,591,403 A | 1/1997 | Gavin et al. | |
| 5,623,415 A | 4/1997 | O'Bryan et al. | |
| 5,753,456 A | 5/1998 | Naqui et al. | |
| 5,768,407 A | 6/1998 | Shen et al. | |
| 5,858,648 A | 1/1999 | Steel et al. | |
| 5,879,628 A | 3/1999 | Ridgeway et al. | |
| 5,888,834 A | 3/1999 | Ishikawa et al. | |
| 5,939,326 A | 8/1999 | Chupp et al. | |
| 5,948,686 A | 9/1999 | Wardlaw | |
| 6,004,821 A | 12/1999 | Levine et al. | |
| 6,016,367 A | 1/2000 | Benedetti et al. | |
| 6,017,767 A | 1/2000 | Chandler | |
| 6,022,734 A | 2/2000 | Wardlaw | |
| 6,083,761 A | 7/2000 | Kedar et al. | |
| 6,106,778 A | 8/2000 | Oku et al. | |
| 6,180,314 B1 | 1/2001 | Berndt | |
| 6,235,536 B1 | 5/2001 | Wardlaw | |
| 6,350,613 B1 | 2/2002 | Wardlaw et al. | |
| 6,358,475 B1 | 3/2002 | Berndt | |
| 6,429,027 B1 | 8/2002 | Chee et al. | |
| 6,503,760 B2 | 1/2003 | Malmqvist et al. | |
| 6,551,554 B1 | 4/2003 | Vermeiden et al. | |
| 6,623,701 B1 | 9/2003 | Eichele et al. | |
| 6,632,652 B1 | 10/2003 | Austin et al. | |
| 6,714,287 B2 | 3/2004 | Berndt | |
| 6,723,290 B1 | 4/2004 | Wardlaw | |
| 6,844,201 B2 | 1/2005 | Malmqvist et al. | |
| 6,866,823 B2 | 3/2005 | Wardlaw | |
| 6,869,570 B2 | 3/2005 | Wardlaw | |
| 6,893,850 B2 | 5/2005 | Ostuni et al. | |
| 6,921,514 B1 | 7/2005 | Vetter et al. | |
| 6,929,953 B1 | 8/2005 | Wardlaw | |
| 6,939,032 B2 | 9/2005 | Cosby et al. | |
| 7,101,341 B2 | 9/2006 | Tsukashima et al. | |
| 7,179,423 B2 | 2/2007 | Bohm et al. | |
| 7,282,367 B2 | 10/2007 | Kawamura | |
| 7,393,658 B2 | 7/2008 | Carbonell et al. | |
| 7,410,617 B2 | 8/2008 | Sakamoto | |
| 7,410,807 B2 | 8/2008 | D'Aurora | |
| 7,468,160 B2 | 12/2008 | Thompson et al. | |
| 7,510,841 B2 | 3/2009 | Stuelpnagel et al. | |
| 7,510,848 B2 | 3/2009 | Hammond et al. | |
| 7,547,424 B2 | 6/2009 | Haab et al. | |
| 7,731,901 B2 * | 6/2010 | Wardlaw | G02B 21/34 |
| | | | 422/73 |
| 7,738,094 B2 | 6/2010 | Goldberg | |
| 7,799,558 B1 | 9/2010 | Dultz | |
| 7,850,916 B2 | 12/2010 | Wardlaw | |
| 7,862,773 B2 | 1/2011 | Ibrahim | |
| 7,863,411 B2 | 1/2011 | Hammond et al. | |
| 7,897,376 B2 | 3/2011 | Porter et al. | |
| 7,901,897 B2 | 3/2011 | Stuelpnagel et al. | |
| 7,903,241 B2 | 3/2011 | Wardlaw et al. | |
| 7,929,121 B2 | 4/2011 | Wardlaw et al. | |
| 7,929,122 B2 | 4/2011 | Wardlaw et al. | |
| 7,943,093 B2 | 5/2011 | Adrien et al. | |
| 7,951,599 B2 | 5/2011 | Levine et al. | |
| 7,995,194 B2 | 8/2011 | Wardlaw et al. | |
| 8,045,165 B2 | 10/2011 | Wardlaw et al. | |
| 8,058,073 B2 | 11/2011 | Chiapperi et al. | |
| 8,077,296 B2 | 12/2011 | Wardlaw et al. | |
| 8,081,303 B2 | 12/2011 | Levine et al. | |
| 8,133,738 B2 | 3/2012 | Levine et al. | |
| 8,144,504 B2 | 3/2012 | Kim et al. | |
| 8,158,434 B2 | 4/2012 | Wardlaw | |
| 8,221,985 B2 | 7/2012 | Wardlaw et al. | |
| 8,241,572 B2 | 8/2012 | Wardlaw | |
| 8,269,954 B2 | 9/2012 | Levine et al. | |
| 8,284,384 B2 | 10/2012 | Levine et al. | |
| 8,287,820 B2 | 10/2012 | Williams et al. | |
| 8,310,658 B2 | 11/2012 | Wardlaw et al. | |
| 8,310,659 B2 | 11/2012 | Wardlaw et al. | |
| 8,319,954 B2 | 11/2012 | Wardlaw et al. | |
| 8,326,008 B2 | 12/2012 | Lalpuria et al. | |
| 8,338,579 B2 | 12/2012 | Adams et al. | |
| 8,361,799 B2 | 1/2013 | Levine et al. | |
| 8,367,012 B2 | 2/2013 | Wardlaw | |
| 8,462,332 B2 | 6/2013 | Pugia et al. | |
| 8,467,063 B2 | 6/2013 | Wardlaw et al. | |
| 8,472,693 B2 | 6/2013 | Davis et al. | |
| 8,481,282 B2 | 7/2013 | Levine et al. | |
| 8,502,963 B2 | 8/2013 | Levine et al. | |
| 8,513,032 B2 | 8/2013 | Jablonski et al. | |
| 8,569,076 B2 | 10/2013 | Wardlaw et al. | |
| 8,594,768 B2 | 11/2013 | Phillips et al. | |
| 8,604,161 B2 | 12/2013 | Hammond et al. | |
| 8,628,952 B2 | 1/2014 | Stuelpnagel et al. | |
| 8,633,013 B2 | 1/2014 | Kaiser et al. | |
| 8,638,427 B2 | 1/2014 | Wardlaw et al. | |
| 8,717,673 B2 | 5/2014 | Selvin et al. | |
| 8,741,630 B2 | 6/2014 | Dickinson et al. | |
| 8,750,966 B2 | 6/2014 | Phillips et al. | |
| 8,778,687 B2 | 7/2014 | Levine et al. | |
| 8,781,203 B2 | 7/2014 | Davis et al. | |
| 8,796,186 B2 | 8/2014 | Shirazi | |
| 8,797,527 B2 | 8/2014 | Hukari et al. | |
| 8,835,186 B2 | 9/2014 | Jablonski et al. | |
| 8,837,803 B2 | 9/2014 | Wang et al. | |
| 8,842,264 B2 | 9/2014 | Wardlaw et al. | |
| 8,885,154 B2 | 11/2014 | Wardlaw et al. | |
| 8,906,700 B2 | 12/2014 | Lim et al. | |
| 8,911,815 B2 | 12/2014 | Kram et al. | |
| 8,974,732 B2 | 3/2015 | Lalpuria et al. | |
| 8,994,930 B2 | 3/2015 | Levine et al. | |
| 9,005,901 B2 | 4/2015 | Gayda et al. | |
| 9,023,641 B2 | 5/2015 | Rodriguez et al. | |
| 9,044,268 B2 | 6/2015 | Phillips et al. | |
| 9,046,473 B2 | 6/2015 | Levine et al. | |
| 9,084,995 B2 | 7/2015 | Wardlaw | |
| 9,086,408 B2 | 7/2015 | Egan et al. | |
| 9,097,640 B2 | 8/2015 | Goldberg et al. | |
| 9,199,233 B2 | 12/2015 | Wardlaw | |
| 9,274,094 B2 | 3/2016 | Wardlaw et al. | |
| 9,291,617 B2 | 3/2016 | Levine et al. | |
| 9,322,835 B2 | 4/2016 | Wardlaw | |
| 9,347,962 B2 | 5/2016 | Salsman | |
| 9,354,159 B2 | 5/2016 | Vaartstra | |
| 9,395,365 B2 | 7/2016 | Levine et al. | |

(56) References Cited

U.S. PATENT DOCUMENTS

| | | |
|---|---|---|
| 9,469,871 B2 | 10/2016 | Bearinger et al. |
| 9,523,670 B2 | 12/2016 | Mueller et al. |
| 9,696,252 B2 | 7/2017 | Wardlaw |
| 2001/0055882 A1 | 12/2001 | Ostuni |
| 2003/0068614 A1 | 4/2003 | Cima et al. |
| 2003/0107946 A1 | 6/2003 | Cosby et al. |
| 2003/0109059 A1 | 6/2003 | Adrien et al. |
| 2004/0131345 A1 | 7/2004 | Kylberg et al. |
| 2004/0156755 A1 | 8/2004 | Levine |
| 2004/0214310 A1 | 10/2004 | Parker et al. |
| 2004/0259162 A1 | 12/2004 | Kappel et al. |
| 2005/0026161 A1 | 2/2005 | Jablonski et al. |
| 2005/0032138 A1 | 2/2005 | Lathrop et al. |
| 2005/0158880 A1 | 7/2005 | Ostuni et al. |
| 2005/0254995 A1 | 11/2005 | Sostek et al. |
| 2006/0015157 A1 | 1/2006 | Leong |
| 2006/0051253 A1 | 3/2006 | Gousepohl |
| 2006/0062440 A1 | 3/2006 | Hollars et al. |
| 2006/0062695 A1 | 3/2006 | Haab et al. |
| 2006/0090658 A1 | 5/2006 | Phillips |
| 2006/0160134 A1 | 7/2006 | Melker et al. |
| 2007/0087442 A1 | 4/2007 | Wardlaw |
| 2007/0243117 A1 | 10/2007 | Wardlaw |
| 2008/0028962 A1 | 2/2008 | Phillips et al. |
| 2008/0180685 A1 | 7/2008 | de Laga et al. |
| 2008/0214947 A1 | 9/2008 | Hunt et al. |
| 2008/0274564 A1 | 11/2008 | D'Aurora |
| 2008/0286152 A1 | 11/2008 | Schmidt et al. |
| 2009/0211344 A1 | 8/2009 | Wang |
| 2009/0227472 A1 | 9/2009 | Stuelpnagel et al. |
| 2009/0233329 A1 | 9/2009 | Rodriguez et al. |
| 2009/0246781 A1 | 10/2009 | Klem et al. |
| 2009/0258371 A1 | 10/2009 | Wardlaw et al. |
| 2009/0298716 A1 | 12/2009 | Stuelpnagel et al. |
| 2010/0081583 A1 | 4/2010 | Shirazi |
| 2010/0085067 A1 | 4/2010 | Gabriel et al. |
| 2010/0151593 A1 | 6/2010 | D'Aurora |
| 2010/0216248 A1 | 8/2010 | Wardlaw |
| 2010/0255605 A1 | 10/2010 | Wardlaw |
| 2010/0272345 A1 | 10/2010 | Wardlaw |
| 2010/0273244 A1 | 10/2010 | Wardlaw |
| 2010/0291562 A1 | 11/2010 | Adler |
| 2011/0009297 A1 | 1/2011 | Jones et al. |
| 2011/0206557 A1 | 8/2011 | Phan et al. |
| 2011/0294198 A1 | 12/2011 | Wardlaw |
| 2012/0034647 A1 | 2/2012 | Herzog et al. |
| 2012/0107799 A1 | 5/2012 | Daum |
| 2012/0108787 A1 | 5/2012 | Lue |
| 2012/0157332 A1 | 6/2012 | Kumar et al. |
| 2012/0300293 A1 | 11/2012 | Selvin et al. |
| 2013/0065788 A1 | 3/2013 | Glezer et al. |
| 2013/0102018 A1 | 4/2013 | Schentag et al. |
| 2013/0157288 A1 | 6/2013 | Kilfeather et al. |
| 2013/0209332 A1 | 8/2013 | Wardlaw |
| 2013/0265054 A1 | 10/2013 | Lowery et al. |
| 2013/0309679 A1 | 11/2013 | Ismagilov et al. |
| 2014/0315242 A1 | 10/2014 | Rodriguez et al. |
| 2014/0323330 A1 | 10/2014 | Bergo |
| 2014/0368631 A1 | 12/2014 | Wardlaw et al. |
| 2015/0036131 A1 | 2/2015 | Salsman |
| 2015/0253321 A1 | 9/2015 | Chou et al. |
| 2015/0317506 A1 | 11/2015 | Xie et al. |
| 2015/0323519 A1 | 11/2015 | Wardlaw |
| 2016/0025637 A1 | 1/2016 | Halverson et al. |
| 2016/0033496 A1 | 2/2016 | Chou et al. |
| 2016/0245797 A1 | 8/2016 | Ahmad et al. |
| 2016/0266091 A1 | 9/2016 | Levine et al. |
| 2016/0350914 A1 | 12/2016 | Champlin et al. |
| 2017/0021356 A1 | 1/2017 | Dority et al. |
| 2017/0038401 A1 | 2/2017 | Holmes et al. |
| 2017/0045504 A1 | 2/2017 | Bloom |

FOREIGN PATENT DOCUMENTS

| | | | |
|---|---|---|---|
| CN | 1299466 | 6/2001 | |
| CN | 1302229 | 7/2001 | |
| CN | 1166950 | 9/2004 | |
| CN | 1188217 | 2/2005 | |
| CN | 102027369 | 4/2011 | |
| EP | 261667 A2 | 3/1988 | |
| EP | 291153 A1 | 11/1988 | |
| EP | 261667 A3 | 5/1989 | |
| EP | 291153 B1 | 6/1992 | |
| EP | 261667 B1 | 2/1993 | |
| EP | 0961110 | 12/1999 | |
| EP | 1949310 A2 | 7/2008 | |
| EP | 2290100 | 3/2011 | |
| EP | 1949310 A4 | 11/2011 | |
| EP | 2439515 | 4/2012 | |
| EP | 2554987 | 2/2013 | |
| EP | 2848196 | 3/2015 | |
| EP | 3026433 | 6/2016 | |
| EP | 1949310 B1 | 2/2019 | |
| WO | 1991020009 | 12/1991 | |
| WO | 1999044743 | 9/1999 | |
| WO | 1999045385 | 9/1999 | |
| WO | 2003062920 | 7/2003 | |
| WO | 2005114145 | 12/2005 | |
| WO | 2005100539 | 1/2006 | |
| WO | 2007112332 | 10/2007 | |
| WO | 2009117652 | 9/2009 | |
| WO | 2009117664 | 9/2009 | |
| WO | 2009117678 | 9/2009 | |
| WO | 2009117682 | 9/2009 | |
| WO | 2009124186 | 10/2009 | |
| WO | 2009124190 | 10/2009 | |
| WO | 2009126800 | 10/2009 | |
| WO | 2010115026 | 10/2010 | |
| WO | 2014055559 | 4/2014 | |
| WO | 2014089468 | 6/2014 | |
| WO | 2014183049 | 11/2014 | |
| WO | 2014205576 | 12/2014 | |
| WO | 2017027643 | 2/2017 | |
| WO | WO-2017027643 A1 * | 2/2017 | ........... G01N 1/2813 |
| WO | 2017048871 | 3/2017 | |
| WO | 2017048881 | 3/2017 | |
| WO | WO-2017048871 A1 * | 3/2017 | ........... B01L 3/5055 |
| WO | WO-2017048881 A1 * | 3/2017 | ........... A61B 5/0935 |

OTHER PUBLICATIONS

Jahanmehr, S A H et al., Simple technique for fluorescence staining of blood cells with acridine orange, Technical Methods, Feb. 12, 1987.

Sun, Wei et al., Rapid antimicrobial susceptibility test for identification of new therapeutics and drug combinations against multidrug-resistant bacteria, Emerg. Microbes Infect., Nov. 9, 2016.

Van Vliet, Dillys et al., Prediction of asthma exacerbations in children by innovative exhaled inflammatory markers: Results of a longitudinal study, PLOS ONE, Mar. 23, 2015, vol. 10. No. 3, e0119434.

Written Opinion for PCT/US2018/017713 established by ISA/KR, dated Jun. 20, 2018.

\* cited by examiner

RAPID PH MEASUREMENT

FIELD

Among other things, certain embodiments of the present disclosure are related to devices and methods of performing biological and chemical assays, such as but not limited to pH measurement of bio/chemical samples.

BACKGROUND

In biological and chemical assays (e.g. diagnostic testing), pH measurement is often desired. For instance, pH testing is informative as to personal health monitoring. Acidic balance can be altered and reflected in the pH readouts in bodily fluids (e.g., saliva, urine, and sweat) when a person's health condition is changed. Among others, there are also important applications of pH measurement for food safety regulations, environmental monitoring of air, soil, and water. The present disclosure provides devices and methods to achieve rapid pH measurement.

BRIEF SUMMARY

A device for rapid pH measurement, comprising:
a first plate, a second plate, spacers and a pH indicator, wherein:
the plates are movable relative to each other into different configurations, including an open configuration and a closed configuration;
each of the plates has, on its respective inner surface, a sample contact area for contacting a sample;
one or both of the plates comprise the spacers, at least one of the spacers is inside the sample contact area, and the spacers have a predetermined substantially uniform height; and
one or both of the plates comprise, on the respective inner surface, the pH indicator that, upon contacting the sample, exhibits a color indicative of a pH value of the sample;
wherein, in the open configuration, the two plates are partially or entirely separated apart, the spacing between the first plate and the second plate is not regulated by the spacers, and the sample is deposited on one or both of the plates; and
wherein in the closed configuration, which is configured after deposition of the sample in the open configuration: at least part of the sample is compressed by the two plates into a layer of uniform thickness, the layer is confined by the inner surfaces of the plates and has its thickness regulated by the spacers and the plates.

A system for rapid pH measurement, comprising:
(a) a device of any embodiment of the present disclosure; and
(b) a detector that detects the color of the pH indicator in the layer of uniform thickness.

A smartphone system for a rapid homogenous assay, comprising:
(a) a device of any embodiment of the present disclosure;
(b) a mobile communication device that comprises:
i. one or a plurality of cameras for detecting and/or imaging the sample; and
ii. electronics, signal processors, hardware and software for receiving and/or processing the detected signal and/or an image of the sample and for remote communication; and
(c) an adaptor that is configured to hold the device in the closed configuration and engageable to the mobile communication device;
wherein when engaged with the mobile communication device, the adaptor is configured to facilitate the detection and/or imaging of the sample when the plates are in the closed configuration.

The device or system of any embodiment of the present disclosure, further comprising at least one imager that images a part of the sample that is between the two plates when the two plates are in the closed configuration.

A device with an algorithm that determining the pH value from images of the at least part of the sample by using artificial intelligence and machine learning.

A method for performing a rapid homogenous assay, comprising:
(a) obtaining a sample;
(b) obtaining a device of any embodiment of the present disclosure;
(c) depositing the sample on one or both of the plates when the plates are in the open configuration;
(d) after (c), bringing the two plates together and pressing the plates into the closed configuration; and
(e) while the plates are in the closed configuration, detecting and analyzing the color of the pH indicator.

A method of analyzing an image for a rapid homogenous assay, comprising:
(a) obtaining an image of a signal in the device of any embodiment of the present disclosure at the closed configuration, wherein the image is selected from the group consisting of a bright field image, a dark field image, a fluorescence image, and a phosphorescence image; (b) analyzing the image, wherein the analyzing comprises (i) identifying beads in the image, and (ii) extracting information of a bead size, a signal intensity of one or more beads, a distance between beads, a distribution of beads, and/or a number of beads; and
(c) determining analyte concentration using the extracted information from step (b) and calculating parameters of the beads.

A method of performing a homogenous assay, comprising:
(a) obtaining a sample;
(b) obtaining a first plate and a second plate that are movable relative to each other into different configurations, including an open configuration and a closed configuration, wherein:
each of the plates has, on its respective inner surface, a sample contact area for contacting the sample,
one or both of the plates comprise spacers, and at least one of the spacers is inside the sample contact area; and
one or both of the plates comprise, on the respective inner surface, a pH indicator that, upon contacting the sample, exhibits color indicative of a pH of the sample;
wherein the spacers have a predetermined substantially uniform height;
(c) depositing the sample on one or both of the plates when the plates are in an open configuration, wherein in the open configuration the two plates are partially or entirely separated apart and the spacing between the plates is not regulated by the spacers;
(d) after (c), bringing the two plates together and pressing the plates into a closed configuration, wherein in the closed configuration: at least part of the sample is compressed by the two plates into a layer of uniform thickness, the uniform thickness of the layer is confined by the inner surfaces of the two plates and is regulated by the spacers and the plates; and
(e) while the plates are at the closed configuration, detecting and analyzing the color of the pH indicator in the layer of uniform thickness.

A method comprising:
obtaining a sample;
obtaining a device of any embodiment of the present disclosure;
depositing the sample on one or both of the plates when the plates are in the open configuration;
after (c), bringing the two plates together and pressing the plates into the closed configuration; and
while the plates are in the closed configuration, detecting and analyzing at least one of the hue and the saturation of the color of the pH indicator to determine a pH of the sample.

A method comprising:
obtaining a sample;
obtaining a device of any embodiment of the present disclosure;
depositing the sample on one or both of the plates when the plates are in the open configuration;
after (c), bringing the two plates together and pressing the plates into the closed configuration; and
while the plates are in the closed configuration, detecting and analyzing both of the hue and the saturation of the color of the pH indicator to determine a pH of the sample.

The method of any embodiment of the present disclosure, wherein the analyzing comprises using a correlation between the hue and the saturation to determine the pH of the sample.

The method of any embodiment of the present disclosure, wherein the analyzing comprises calculating the volume of a relevant sample volume as a product of the lateral area of the relevant sample volume and the predetermined spacer height.

The method of any embodiment of the present disclosure, wherein the pH value at a location of the sample that is between the two plates in the closed configuration is determined using the relevant sample volume and by analyzing one or more images taken from the location.

The method of any embodiment of the present disclosure, wherein determining the pH value comprises analyzing an image using artificial intelligence and/or machine learning.

The device, system, smartphone system, or method of any embodiment of the present disclosure, wherein the image is selected from the group consisting of bright field image, dark field image, fluorescence image, and phosphorescence image.

The device, system, smartphone system, or method of any embodiment of the present disclosure, wherein the pH indicator is at least one compound selected from the group consisting of Gentian violet (Methyl violet 10B), Malachite green, Thymol blue, Methyl yellow, Bromophenol blue, Congo red, Methyl orange, Methyl Orange-Xylene Cyanol, Screened methyl orange, Bromocresol green, Methyl red, Methyl purple, Azolitmin, Bromocresol purple, Bromothymol blue, Phenol red, Neutral red, Naphtholphthalein, Cresol red, Cresolphthalein, Cresol Purple, Dichlorofluorescein, Phenolphthalein, Thymolphthalein, Alizarine Yellow R, Alizarin Red S, and Indigo carmine.

The device, system, smartphone system, or method of any embodiment of the present disclosure, wherein the pH indicator comprises Thymol blue, Methyl blue, and Bromothymol blue.

The device, system, smartphone system, or method of any embodiment of the present disclosure, wherein the pH indicator comprises a mixture of Thymol blue, Methyl blue, and Bromothymol blue in a ratio of 1:2.5:10 by weight.

The device, system, smartphone system, or method of any embodiment of the present disclosure, wherein one or both of the plates comprise one or more color standards with predetermined color values.

The device, system, smartphone system, or method of any embodiment of the present disclosure, wherein the pH indicator is substantially uniformly coated on the one or both of the plates.

The device, system, smartphone system, or method of any embodiment of the present disclosure, wherein the pressing is by human hand.

The device, system, smartphone system, or method of any embodiment of the present disclosure, wherein at least a portion of the inner surface of one plate or both plates is hydrophilic.

The device, system, smartphone system, or method of any embodiment of the present disclosure, wherein the inter spacer distance is periodic.

The device, system, smartphone system, or method of any embodiment of the present disclosure, wherein the sample is deposited directly from a subject onto the plate without using a transferring device.

The device, system, smartphone system, or method of any embodiment of the present disclosure, wherein after the sample deformation at a closed configuration, the sample maintains the uniform thickness after some or all of a compressing force is removed.

The device, system, smartphone system, or method of any embodiment of the present disclosure, wherein the spacers have a pillar shape.

The device, system, smartphone system, or method of any embodiment of the present disclosure, wherein the spacers have a nearly uniform cross-section.

The device, system, smartphone system, or method of any embodiment of the present disclosure, wherein the spacers have a substantially flat top surface.

The device, system, smartphone system, or method of any embodiment of the present disclosure, wherein the spacers have a predetermined constant inter-spacer distance.

The device, system, smartphone system, or method of any embodiment of the present disclosure, wherein the predetermined constant inter-spacer distance is at least about 2 times larger than the size of the analyte.

The device, system, smartphone system, or method of any embodiment of the present disclosure, wherein the Young's modulus of the spacers times a filling factor of the spacers is equal or larger than 2 MPa.

The device, system, smartphone system, or method of any embodiment of the present disclosure, wherein the filling factor is the ratio of the spacer contact area to the total plate area The device, system, smartphone system, or method of any embodiment of the present disclosure, wherein the inter spacer distance (SD) is equal or less than about 120 um (micrometer).

The device, system, smartphone system, or method of any embodiment of the present disclosure, wherein the inter spacer distance (SD) is equal or less than about 100 um (micrometer).

The device, system, smartphone system, or method of any embodiment of the present disclosure, wherein the fourth power of the inter-spacer-distance (ISD) divided by the thickness (h) and the Young's modulus (E) of the flexible plate (ISD^4/(hE)) is 5×10^6 um^3/GPa or less.

The device, system, smartphone system, or method of any embodiment of the present disclosure, wherein the fourth power of the inter-spacer-distance (ISD) divided by the thickness (h) and the Young's modulus (E) of the flexible plate (ISD^4/(hE)) is 5×10^5 um^3/GPa or less.

The device, system, smartphone system, or method of any embodiment of the present disclosure, wherein the spacers have a pillar shape, a substantially flat top surface, a predetermined substantially uniform height, and a predetermined constant inter-spacer distance that is at least about 2 times larger than the size of the analyte, wherein the Young's modulus of the spacers times a filling factor of the spacers is equal or larger than 2 MPa, wherein the filling factor is the ratio of the spacer contact area to the total plate area, and wherein, for each spacer, the ratio of the lateral dimension of the spacer to its height is at least 1 (one).

The device, system, smartphone system, or method of any embodiment of the present disclosure, wherein the spacers have pillar shape, a substantially flat top surface, a predetermined substantially uniform height, and a predetermined constant inter-spacer distance that is at least about 2 times larger than the size of the analyte, wherein the Young's modulus of the spacers times a filling factor of the spacers is equal or larger than 2 MPa, wherein the filling factor is the ratio of the spacer contact area to the total plate area, and wherein, for each spacer, the ratio of the lateral dimension of the spacer to its height is at least 1 (one), wherein the fourth power of the inter-spacer-distance (ISD) divided by the thickness (h) and the Young's modulus (E) of the flexible plate (ISD^4/(hE)) is 5×10^6 um^3/GPa or less.

The device, system, smartphone system, or method of any embodiment of the present disclosure, wherein the ratio of the inter-spacing distance of the spacers to the average width of the spacer is 2 or larger, and the filling factor of the spacers multiplied by the Young's modulus of the spacers is 2 MPa or larger.

The device, system, smartphone system, or method of any embodiment of the present disclosure, wherein the analyte is selected from the group consisting of proteins, peptides, nucleic acids, synthetic compounds, and inorganic compounds.

The device, system, smartphone system, or method of any embodiment of the present disclosure, wherein the sample is a biological sample selected from amniotic fluid, aqueous humour, vitreous humour, blood, whole blood, fractionated blood, plasma, serum, breast milk, cerebrospinal fluid (CSF), cerumen (earwax), chyle, chime, endolymph, perilymph, feces, breath, gastric acid, gastric juice, lymph, mucus, nasal drainage, phlegm, pericardial fluid, peritoneal fluid, pleural fluid, pus, rheum, saliva, exhaled breath condensates, sebum, semen, sputum, sweat, synovial fluid, tears, vomit, and urine.

The device, system, smartphone system, or method of any embodiment of the present disclosure wherein the spacers have a shape of pillars and a ratio of the width to the height of the pillar is equal or larger than one.

The method of any embodiment of the present disclosure, wherein the sample that is deposited on one or both of the plates has an unknown volume.

The device, system, smartphone system, or method of any embodiment of the present disclosure, wherein the spacers have a shape of pillar, and the pillar has substantially uniform cross-section.

The device, system, smartphone system, or method of any embodiment of the present disclosure wherein the sample is for the detection, purification and quantification of chemical compounds or biomolecules that correlates with the stage of certain diseases.

The device, system, smartphone system, or method of any embodiment of the present disclosure, wherein the sample is obtained from a subject having a condition selected from the group consisting of infectious and parasitic disease, injuries, cardiovascular disease, cancer, mental disorders, neuropsychiatric disorders, pulmonary diseases, renal diseases, and other and organic diseases.

The device, system, smartphone system, or method of any embodiment of the present disclosure, wherein the method comprises at least one of detection, purification and quantification of a microorganism.

The device, system, smartphone system, or method of any embodiment of the present disclosure, wherein the sample comprises at least one selected from the group consisting of virus, fungus, bacteria from environment, water, soil, and biological samples.

The device, system, smartphone system, or method of any embodiment of the present disclosure, wherein the method comprises at least one of detection and quantification of chemical compounds or biological samples that pose hazard to food safety or national security, toxic waste, and anthrax.

The device, system, smartphone system, or method of any embodiment of the present disclosure, wherein the method comprises quantification of vital parameters in medical or physiological monitor.

The device, system, smartphone system, or method of any embodiment of the present disclosure, wherein the method comprises measuring at least one of glucose, blood, oxygen level, total blood count.

The device, system, smartphone system, or method of any embodiment of the present disclosure, wherein the method comprises at least one of detection and quantification of specific DNA or RNA from biosamples.

The device, system, smartphone system, or method of any embodiment of the present disclosure, wherein the method comprises at least one of sequencing and comparing genetic sequences in DNA in the chromosomes and mitochondria for genome analysis.

The device, system, smartphone system, or method of any embodiment of the present disclosure, wherein the method comprises detecting reaction products.

The device, system, smartphone system, or method of any embodiment of the present disclosure, wherein the method comprises detecting reaction products during synthesis or purification of pharmaceuticals.

The device, system, smartphone system, or method of any embodiment of the present disclosure, wherein the sample comprises at least one selected from the group consisting of cells, tissues, bodily fluids, and stool.

The device, system, smartphone system, or method of any embodiment of the present disclosure, wherein the sample is the sample in the detection of proteins, peptides, nucleic acids, synthetic compounds, inorganic compounds.

The device, system, smartphone system, or method of any embodiment of the present disclosure, wherein the sample is the sample in a field selected from the group consisting of human, veterinary, agriculture, foods, environments, and drug testing.

The device, system, smartphone system, or method or device of any embodiment of the present disclosure, wherein the sample is a biological sample selected from the group consisting of blood, serum, plasma, a nasal swab, a nasopharyngeal wash, saliva, urine, gastric fluid, spinal fluid, tears, stool, mucus, sweat, earwax, oil, a glandular secretion, cerebral spinal fluid, tissue, semen, vaginal fluid, interstitial fluids derived from tumorous tissue, ocular fluids, spinal fluid, a throat swab, breath, hair, finger nails, skin, biopsy, placental fluid, amniotic fluid, cord blood, lymphatic fluids, cavity fluids, sputum, pus, microbiota, meconium, breast milk, exhaled condensate nasopharyngeal wash, nasal swab, throat swab, stool samples, hair, finger nail, ear wax, breath, connective tissue, muscle tissue, nervous tissue, epithelial tissue, cartilage, cancerous sample, and bone.

BRIEF DESCRIPTION OF THE DRAWINGS

The skilled artisan will understand that the drawings, described below, are for illustration purposes only. The drawings are not intended to limit the scope of the present teachings in any way. In some Figures, the drawings are in scale. In the figures that present experimental data points, the lines that connect the data points are for guiding a viewing of the data only and have no other means.

DETAILED DESCRIPTION OF EXEMPLARY EMBODIMENTS

Figure 1:
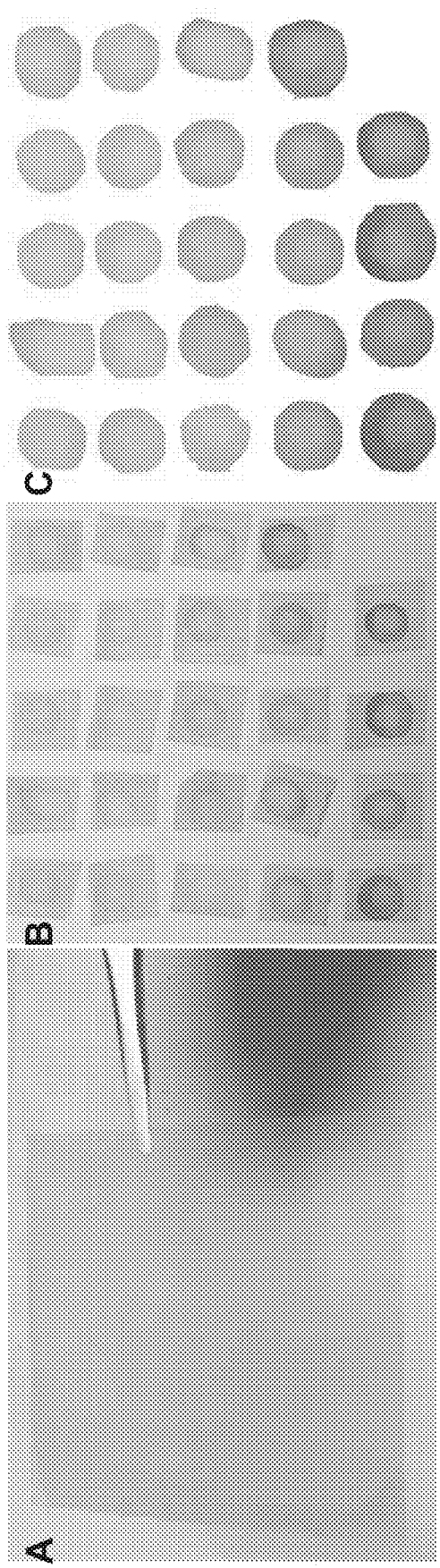
FIG. 1 shows pictures taken during an exemplary RHA assay.

The following detailed description illustrates some embodiments of the present disclosure by way of example and not by way of limitation. If any, the section headings and any subtitles used herein are for organizational purposes only and are not to be construed as limiting the subject matter described in any way. The contents under a section heading and/or subtitle are not limited to the section heading and/or subtitle, but can apply to any embodiment of the present disclosure.

The citation of any publication is for its disclosure prior to the filing date and should not be construed as an admission that the present claims are not entitled to antedate such publication by virtue of prior invention. Further, the dates of publication provided can be different from the actual publication dates which can need to be independently confirmed.

It should be noted that the Figures do not intend to show the elements in strict proportion. For clarity purposes, some elements are enlarged when illustrated in the Figures. The dimensions of the elements should be delineated from the descriptions herein provided and incorporated by reference.

Definitions

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present teachings, some exemplary methods and materials are now described.

The term "hue" can refer to the quality of color as perceived visually, usually described with respect to one or a combination of color names, including, but not limited to, white, gray, black, red, yellow, green blue. The term "hue" can also refer to the angle between one color or color component and other colors or color components characterized in a particular color space, for example, RGB color space, featuring a color based three-dimensional coordinate system, within a digital video input image. Hue is also referred to as tint, or, as a gradation or shade of a color or color component. The term "saturation" can refer to the intensity of a color or color component characterized in a particular color space, for example, RGB color space, featuring a color based three-dimensional coordinate system, within a real time digital video input image. Saturation is also referred to as vividness of hue. Controlling colors in a displayed digital video image can be performed by changing the hue, and/or, by increasing or decreasing the saturation of the colors or color components of the digital video image. The term "individual color" represents a linear combination of colors or color components, such as red, green, blue, yellow, cyan, and magenta, where, in RGB color space, the basic odors or color components are red, green, and blue, which are used for defining and evaluating the complementary colors or color components yellow, cyan, and magenta, and, in YOM color space, the basic colors or color components are yellow, cyan, and magenta, which are used for defining and evaluating the complementary colors or color components red, green, and blue.

The terms "pH" as used herein can refer to potential of hydrogen, which is a numeric c scale used to specify the acidity or basicity of an aqueous solution. In general, the pH value to be tested and reported by the devices and methods of the present disclosure is in the range of 0-14. In certain embodiments, the pH number to be tested and reported by the devices and methods provided by the present disclosure is less than 0 or higher than 14. In certain circumstances of the present disclosure, it is conceptually interchangeable with "hydrogen concentration", "acidity", and "basicity", if no unit is specified. The pH value of a neutral liquid sample is 7.0. Samples with a pH value below 7.0 are considered acidic and samples with pH value above 7.0 are basic (alkaline).

The term "pH indicator" as used herein can refer to one or a mixture of chemical compounds that exhibit color indicative of the pH of a sample when added into such sample. They are generally halochromic chemical compounds and added in small amounts to a liquid sample, so that the pH (acidity or basicity) of the sample can be determined by the color they turn to. Hence, a pH indicator is a chemical detector for hydronium ions ($H_3O+$) or hydrogen ions ($H+$) in the Arrhenius model. Normally, the indicator causes the color of the sample to change depending on the pH. In certain cases, the indicator is not soluble in the sample, nor does it substantially affect the color of the sample, although it changes its own color, depending on the pH of the sample.

The term "operational pH range" of a pH indicator is a range of pH values within which the referenced pH indicator changes color depending on the pH value. Each operational pH range has a low end and a high end, which define such range. For instance, for pH dye methyl red, its operational pH range is 4.4-6.2. pH=4.4 is the low end of its operational pH range, at which methyl red is red in color; and pH=6.2 is the high end, at which it is yellow.

The terms "polypeptide", "peptide" and "protein" are used interchangeably herein to refer to polymers of amino acids of any length. The polymer may be linear or branched, it may comprise modified amino acids, and it may be interrupted by non-amino acids. The terms also encompass an amino acid polymer that has been modified; for example, disulfide bond formation, glycosylation, lipidation, acetylation, phosphorylation, or any other manipulation, such as conjugation with a labeling component. As used herein the term "amino acid" can refer to either natural and/or unnatural or synthetic amino acids, including glycine and both the D or L optical isomers, and amino acid analogs and peptidomimetics.

The term "sample" as used herein relates to a material or mixture of materials containing one or more analytes or entity of interest. In particular embodiments, the sample may be obtained from a biological sample such as cells, tissues, bodily fluids, and stool. Bodily fluids of interest include but are not limited to, amniotic fluid, aqueous humour, vitreous humour, blood (e.g., whole blood, fractionated blood, plasma, serum, etc.), breast milk, cerebrospinal fluid (CSF), cerumen (earwax), chyle, chime, endolymph, perilymph, feces, gastric acid, gastric juice, lymph, mucus (including nasal drainage and phlegm), pericardial fluid, peritoneal fluid, pleural fluid, pus, rheum, saliva, sebum (skin oil), semen, sputum, sweat, synovial fluid, tears, vomit, urine and exhaled condensate. In particular embodiments, a sample may be obtained from a subject, e.g., a human, and it may be processed prior to use in the subject assay. For example, prior to analysis, the protein/nucleic acid may be extracted from a tissue sample prior to use, methods for which are known. In particular embodiments, the sample may be a clinical sample, e.g., a sample collected from a patient.

The term "analyte" can refer to a molecule (e.g., a protein, peptides, DNA, RNA, nucleic acid, or other molecule), cells, tissues, viruses, and nanoparticles with different shapes.

The term "assaying" can refer to testing a sample to detect the presence and/or abundance of an analyte.

As used herein, the terms "determining," "measuring," and "assessing," and "assaying" are used interchangeably and include both quantitative and qualitative determinations.

As used herein, the term "light-emitting label" can refer to a label that can emit light when under an external excitation. This can be luminescence. Fluorescent labels (which include dye molecules or quantum dots), and luminescent labels (e.g., electro- or chemi-luminescent labels) are types of light-emitting label. The external excitation is light (photons) for fluorescence, electrical current for electroluminescence and chemical reaction for chemi-luminescence. An external excitation can be a combination of the above.

The terms "hybridizing" and "binding", with respect to nucleic acids, are used interchangeably.

The term "capture agent/analyte complex" is a complex that results from the specific binding of a capture agent with an analyte. A capture agent and an analyte for the capture agent will usually specifically bind to each other under "specific binding conditions" or "conditions suitable for specific binding", where such conditions are those conditions (in terms of salt concentration, pH, detergent, protein concentration, temperature, etc.) which allow for binding to occur between capture agents and analytes to bind in solution. Such conditions, particularly with respect to antibodies and their antigens and nucleic acid hybridization are well known in the art (see, e.g., Harlow and Lane (Antibodies: A Laboratory Manual Cold Spring Harbor Laboratory, Cold Spring Harbor, N.Y. (1989) and Ausubel, et al, Short Protocols in Molecular Biology, 5th ed., Wiley & Sons, 2002).

The term "specific binding conditions" and "conditions suitable for binding," as used herein with respect to binding of a capture agent to an analyte, e.g., a biomarker, a biomolecule, a synthetic organic compound, an inorganic compound, etc., can refer to conditions that produce nucleic acid duplexes or, protein/protein (e.g., antibody/antigen) complexes, protein/compound complexes, aptamer/target complexes that contain pairs of molecules that specifically bind to one another, while, at the same time, disfavor to the formation of complexes between molecules that do not specifically bind to one another. Specific binding conditions are the summation or combination (totality) of both hybridization and wash conditions, and may include a wash and blocking steps, if necessary. For nucleic acid hybridization, specific binding conditions can be achieved by incubation at 42° C. in a solution: 50% formamide, 5×SSC (150 mM NaCl, 15 mM trisodium citrate), 50 mM sodium phosphate (pH7.6), 5×Denhardt's solution, 10% dextran sulfate, and 20 ug/ml denatured, sheared salmon sperm DNA, followed by washing the filters in 0.1×SSC at about 65° C.

For binding of an antibody to an antigen, specific binding conditions can be achieved by blocking a first plate containing antibodies in blocking solution (e.g., PBS with 3% BSA or non-fat milk), followed by incubation with a sample containing analytes in diluted blocking buffer. After this incubation, the first plate is washed in washing solution (e.g. PBS+TWEEN 20) and incubated with a secondary capture antibody (detection antibody, which recognizes a second site in the antigen). The secondary capture antibody may be conjugated with an optical detectable label, e.g., a fluorophore such as IRDye800CW, Alexa 790, Dylight 800. After another wash, the presence of the bound secondary capture antibody may be detected. One of skill in the art would be knowledgeable as to the parameters that can be modified to increase the signal detected and to reduce the background noise.

A subject may be any human or non-human animal. A subject may be a person performing the instant method, a patient, a customer in a testing center, etc.

An "analyte," as used herein is any substance that is suitable for testing in certain embodiments of the present disclosure.

As used herein, a "diagnostic sample" can refer to any biological sample that is a bodily byproduct, such as bodily fluids, that has been derived from a subject. The diagnostic sample may be obtained directly from the subject in the form of liquid, or may be derived from the subject by first placing the bodily byproduct in a solution, such as a buffer. Exemplary diagnostic samples include, but are not limited to, saliva, serum, blood, sputum, urine, sweat, lacrima, semen, feces, breath, biopsies, mucus, etc.

As used herein, an "environmental sample" can refer to any sample that is obtained from the environment. An environmental sample may include liquid samples from a river, lake, pond, ocean, glaciers, icebergs, rain, snow, sewage, reservoirs, tap water, drinking water, etc.; solid samples from soil, compost, sand, rocks, concrete, wood, brick, sewage, etc.; and gaseous samples from the air, underwater heat vents, industrial exhaust, vehicular exhaust, etc. Samples that are not in liquid form can be converted to liquid form before analyzing the sample with certain embodiments of the present disclosure.

As used herein, a "foodstuff sample" can refer to any sample that is suitable for animal consumption, e.g., human consumption. A foodstuff sample may include raw ingredients, cooked food, plant and animal sources of food, preprocessed food as well as partially or fully processed food, etc. Samples that are not in liquid form can be converted to liquid form before analyzing the sample with certain embodiments of the present disclosure.

The term "diagnostic," as used herein, can refer to the use of a method or an analyte for identifying, predicting the outcome of and/or predicting treatment response of a disease or condition of interest. A diagnosis may include predicting the likelihood of or a predisposition to having a disease or condition, estimating the severity of a disease or condition, determining the risk of progression in a disease or condition, assessing the clinical response to a treatment, and/or predicting the response to treatment.

A "biomarker," as used herein, is any molecule or compound that is found in a sample of interest and that is known to be diagnostic of or associated with the presence of or a predisposition to a disease or condition of interest in the subject from which the sample is derived. Biomarkers include, but are not limited to, polypeptides or a complex thereof (e.g., antigen, antibody), nucleic acids (e.g., DNA, miRNA, mRNA), drug metabolites, lipids, carbohydrates, hormones, vitamins, etc., that are known to be associated with a disease or condition of interest.

A "condition" as used herein with respect to diagnosing a health condition, can refer to a physiological state of mind or body that is distinguishable from other physiological states. A health condition may not be diagnosed as a disease in some cases. Exemplary health conditions of interest include, but are not limited to, nutritional health; aging; exposure to environmental toxins, pesticides, herbicides, synthetic hormone analogs; pregnancy; menopause; andropause; sleep; stress; prediabetes; exercise; fatigue; chemical balance; etc. The term "biotin moiety" can refer to an affinity agent that includes biotin or a biotin analogue such as desthiobiotin, oxybiotin, 2'-iminobiotin, diaminobiotin, biotin sulfoxide, biocytin, etc. Biotin moieties bind to streptavidin with an affinity of at least 10-8M. A biotin affinity agent may also include a linker, e.g., -LC-biotin, -LC-LC-Biotin, -SLC-Biotin or -PEGn-Biotin where n is 3-12.

The term "streptavidin" can refer to both streptavidin and avidin, as well as any variants thereof that bind to biotin with high affinity.

The term "marker", as used in describing a biological sample, can refer to an analyte whose presence or abundance in a biological sample is correlated with a disease or condition.

The term "bond" includes covalent and non-covalent bonds, including hydrogen bonds, ionic bonds and bonds produced by van der Waal forces.

The term "amplify" can refer to an increase in the magnitude of a signal, e.g., at least a 10-fold increase, at least a 100-fold increase at least a 1,000-fold increase, at least a 10,000-fold increase, or at least a 100,000-fold increase in a signal.

The term "entity" can refer to, but not limited to proteins, peptides, DNA, RNA, nucleic acid, molecules (small or large), cells, tissues, viruses, nanoparticles with different shapes, that would bind to a "binding site". The entity includes the capture agent, detection agent, and blocking agent. The "entity" includes the "analyte", and the two terms are used interchangeably.

The term "binding site" can refer to a location on a solid surface that can immobilize "entity" in a sample.

The term "entity partners" can refer to, but not limited to proteins, peptides, DNA, RNA, nucleic acid, molecules (small or large), cells, tissues, viruses, nanoparticles with different shapes, that are on a "binding site" and would bind to the entity. The entity, include, but not limited to, capture agents, detection agents, secondary detection agents, or "capture agent/analyte complex".

The term "target analytes" or "target entity" can refer to a particular analyte that will be specifically analyzed (i.e. detected), or a particular entity that will be specifically bound to the binding site.

The term "smart phone" or "mobile phone", which are used interchangeably, can refer to the type of phones that has a camera and communication hardware and software that can take an image using the camera, manipulate the image taken by the camera, and communicate data to a remote place. In certain embodiments, the Smart Phone has a flash light.

The term "period" of periodic structure array can refer to the distance from the center of a structure to the center of the nearest neighboring identical structure.

The term "storage site" can refer to a site of an area on a plate, wherein the site contains reagents to be added into a sample, and the reagents are capable of being dissolving into the sample that is in contract with the reagents and diffusing in the sample.

The term "relevant" means that it is relevant to detection of analytes, quantification and/or control of analyte or entity in a sample or on a plate, or quantification or control of reagent to be added to a sample or a plate.

The term "hydrophilic", "wetting", or "wet" of a surface means that the contact angle of a sample on the surface is less than 90 degree.

The term "hydrophobic", "non-wetting", or "does not wet" of a surface means that the contact angle of a sample on the surface is equal to or larger than 90 degrees.

The term "variation" of a quantity can refer to the difference between the actual value and the desired value or the average of the quantity. And the term "relative variation" of a quantity can refer to the ratio of the variation to the desired value or the average of the quantity. For example, if the desired value of a quantity is Q and the actual value is $(Q+\mu)$, then the $\mu$ is the variation and the $\mu/(Q+\mu)$ is the relative variation. The term "relative sample thickness variation" can refer to the ratio of the sample thickness variation to the average sample thickness.

The term "optical transparent" can refer to a material that allows a transmission of an optical signal, wherein the term "optical signal" can refer to, unless specified otherwise, the optical signal that is used to probe a property of the sample, the plate, the spacers, the scale-marks, any structures used, or any combinations of thereof.

The term "none-sample-volume" can refer to, at a closed configuration of a CROF process, the volume between the plates that is occupied not by the sample but by other objects that are not the sample. The objects include, but not limited to, spacers, air bubbles, dusts, or any combinations of thereof. Often none-sample-volume(s) is mixed inside the sample.

The term "saturation incubation time" can refer to the time needed for the binding between two types of molecules (e.g. capture agents and analytes) to reach an equilibrium. For a surface immobilization assay, the "saturation incubation time" can refer the time needed for the binding between the target analyte (entity) in the sample and the binding site on plate surface reaches an equilibrium, namely, the time after which the average number of the target molecules (the entity) captured and immobilized by the binding site is statistically nearly constant.

In some cases, the "analyte" and "binding entity" and "entity" are interchangeable.

A "processor," "communication device," "mobile device," refer to computer systems that contain basic electronic elements (including one or more of a memory, input-output interface, central processing unit, instructions, network interface, power source, etc.) to perform computational tasks. The computer system may be a general-purpose computer that contains instructions to perform a specific task, or may be a special-purpose computer.

A "site" or "location" as used in describing signal or data communication can refer to the local area in which a device or subject resides. A site may refer to a room within a building structure, such as a hospital, or a smaller geographically defined area within a larger geographically defined area. A remote site or remote location, with reference to a first site that is remote from a second site, is a first site that is physically separated from the second site by distance and/or by physical obstruction. The remote site may be a first site that is in a separate room from the second site in a building structure, a first site that is in a different building structure from the second site, a first site that is in a different city from the second site, etc.

As used herein, "raw data" includes signals and direct read-outs from sensors, cameras, and other components and instruments which detect or measure properties or characteristics of a sample. For example, raw data includes voltage or current output from a sensor, detector, counter, camera, or other component or device; raw data includes digital or analog numerical output from a sensor, detector, counter, camera, or other component or device; and raw data may include digitized or filtered output from a sensor, detector, counter, camera, or other component or device. For example, raw data includes the output of a luminometer, which may include output in "relative light units" which are related to the number of photons detected by the luminometer. Raw data may include a JPEG, bitmap, or other image file produced by a camera. Raw data may include cell counts; light intensity (at a particular wavelength, or at or within a range of wavelengths); a rate of change of the output of a detector; a difference between similar measurements made at two times; a number of events detected; the number of events detected within a pre-set range or that meet a pre-set criterion; the minimum value measured within a time period, or within a field of view; the maximum value measured within a time period, or within a field of view; and other data. Where sufficient, raw data may be used without further processing or analysis. In other cases, raw data may be further processed or used for further analysis related to the sample, the subject, or for other purposes.

"Representative of a sample" as used in reference to an output signal or raw data that are representative of the sample, can refer to the output signal or raw data reflecting a measured property of the sample or a portion thereof, e.g., reflecting the amount of analyte of interest present in the sample. For instance, the intensity of a fluorescence signal representative of a sample may be more intense in a fluorescently labeled sample that contains more analyte of interest than the intensity of a fluorescence signal representative of a fluorescently labeled sample that contains less analyte.

The practice of various embodiments of the present disclosure employs, unless otherwise indicated, conventional techniques of immunology, biochemistry, chemistry, molecular biology, microbiology, cell biology, genomics and recombinant DNA, which are within the skill of the art. See Green and Sambrook, MOLECULAR CLONING: A LABORATORY MANUAL, 4th edition (2012); CURRENT PROTOCOLS IN MOLECULAR BIOLOGY (F. M. Ausubel, et al. eds., (1987)); the series METHODS IN ENZYMOLOGY (Academic Press, Inc.): PCR 2: A PRACTICAL APPROACH (M. J. MacPherson, B. D. Hames and G. R. Taylor eds. (1995)), Harlow and Lane, eds. (1988) ANTIBODIES, A LABORATORY MANUAL, and ANIMAL CELL CULTURE (R. I. Freshney, ed. (1987)).

As will be apparent to those of skill in the art upon reading this disclosure, each of the individual embodiments described and illustrated herein has discrete components and features which can be readily separated from or combined with the features of any of the other several embodiments without departing from the scope or spirit of the present teachings. Any recited method can be carried out in the order of events recited or in any other order which is logically possible.

One with skill in the art will appreciate that certain embodiments of the present disclosure are not limited in its application to the details of construction, the arrangements of components, category selections, weightings, pre-determined signal limits, or the steps set forth in the description or drawings herein. The invention is capable of other embodiments and of being practiced or being carried out in many different ways.

1. Principles and Examples of Rapid pH Measurement

One objective of certain embodiments of the present disclosure is to perform rapid pH measurement of bio/chemical samples utilizing colorimetric dye(s) in a time frame of 30 sec or less.

Another objective of certain embodiments of the present disclosure is to perform qualitative pH measurement of bio/chemical samples with precision volume control and determination provided by the disclosed devices and color analysis aided with digital image acquisition and processing.

Another objective of certain embodiments of the present disclosure is to perform health monitoring by utilizing the provided devices and methods for rapid pH measurement of bodily fluids and mobile communication device for data acquisition, analysis, and optionally remote communication with health professionals and/or institutions.

1.1 Sample Manipulation and pH Measurement

A device for sample manipulation and pH measurement is provided by certain embodiments of the present disclosure. The device comprises a first plate, a second plate, and spacers that are on one or both of the plates. The two plates and spacers are used to confine a liquid sample that is deposited on one or both of the plates into a thin film. The thickness of the thin film is regulated by the spacers, whereby the volume of the deformed sample is readily determined by multiplying its lateral area and thickness.

Moreover, one or both of the plates comprise a pH indicator that, upon contacting the sample, exhibits color indicative of the pH value of the sample. As discussed below, In certain embodiments, the precision control of the sample volume is beneficial for the quantitative pH measurement.

In certain embodiments, the plates are movable relative to each other into different configurations, including an open configuration and a closed configuration. In certain embodiments, each of the plates has, on its respective inner surface, a sample contact area for contacting a liquid sample. In certain embodiments, one or both of the plates comprise the spacers, at least one of the spacers is inside the sample contact area, and the spacers have a predetermined substantially uniform height. In certain embodiments, one or both of the plates comprise, on the respective inner surface, a pH indicator that, upon contacting the sample, exhibits color indicative of pH value of the sample;

In certain embodiments, in the open configuration, the two plates are partially or entirely separated apart, the spacing between the plates is not regulated by the spacers, and the sample is deposited on one or both of the plates.

In certain embodiments, in the closed configuration, which is configured after deposition of the sample in the open configuration: at least part of the sample is compressed by the two plates into a layer of highly uniform thickness, the uniform thickness of the layer is confined by the inner surfaces of the plates and is regulated by the plates.

1.2 pH Indicator and Color Change

The pH indicator is one or a mixture of chemical compounds that exhibit color indicative of the pH of a sample when added into such sample. They are generally halochromic chemical compounds and added in small amounts to a liquid sample, so that the pH (acidity or basicity) of the sample can be determined by the color they turn to. In certain embodiments, the pH indicator is one chemical compound. In certain embodiments, the pH indicator is a mixture of chemical compounds.

The pH indicator can have any type of operational pH range. In certain embodiments, its operational pH range is a range within 0-14. In certain embodiments, the low end of its operational pH range is less than 0. In certain embodiments, the high end of its operational pH range is higher than 14. In certain embodiments, the pH indicator has a high end of the operational pH range less than 7, therefore particularly appropriate for pH testing of acidic sample. In certain embodiments, the pH indicator has a low end of the operational pH range higher than 7, therefore particularly appropriate for pH testing of basic sample.

The color change of the pH indicator in response to varying pH can be in any form. In certain embodiments, the pH indicator itself has no color, but turn to colorful upon contacting sample that has pH in its operational pH range. In certain embodiments, the pH indicator itself has an initial color, and turn to a different color upon contacting sample that has a pH in its operational pH range.

In certain embodiments, the pH indicator is dissolvable in the sample to be tested, which means that upon contacting the sample, the pH indicator that is coated on the one or both of the plates, is readily dissolved into the sample. The color the pH indicator exhibits thereby affects the color of the sample. For instance, if the sample is colorless, and the pH indicator shows red upon contacting the sample, then the sample will also turn red due to the red pH indicator dissolved therein.

The pH indicator can be any one or mixture of any chemical compounds that exhibit color indicative of the pH of a sample when added into such sample. In certain embodiments, the pH indicator comprises a chemical compound such as, but not limited to, Gentian violet (Methyl violet 10B), Malachite green, Thymol blue, Methyl yellow, Bromophenol blue, Congo red, Methyl orange, Screened methyl orange, Bromocresol green, Methyl red, Methyl purple, Azolitmin, Bromocresol purple, Bromothymol blue, Phenol red, Neutral red, Naphtholphthalein, Cresol red, Cresolphthalein, Phenolphthalein, Thymolphthalein, Alizarine Yellow R, Indigo carmine, and any other chemicals that change color in response to pH change, and any combination thereof.

2. Exemplary Embodiments for Rapid Homogeneous Assays (RHA)

Inventors performed experiments to demonstrate the working principle and practicability of certain embodiments of the present disclosure according to some exemplary embodiments. FIG. 1 shows pictures taken during an exemplary RHA process using 30 um QMAX card. Panel (A) shows the preparation of pH QMAX card, namely, the coating of pH indicators on the inner surface of the QMAX card. In this case, the 30 um QMAX cards (QMAX card with spacers of 30 um height) were dipped in pH indicator solution (100%) and blow dried; the reagent on the side with no structures was wipe cleaned. Table 1 lists the ingredients of the pH solution.

TABLE 1

| pH indicator solution recipe | |
|---|---|
| Chemical | Amount |
| Thymol blue | 25 mg |
| Methyl red | 62.5 mg |
| Bromothymol blue | 250 mg |

Prepared in 500 ml 100% EtOH

Figure 2:
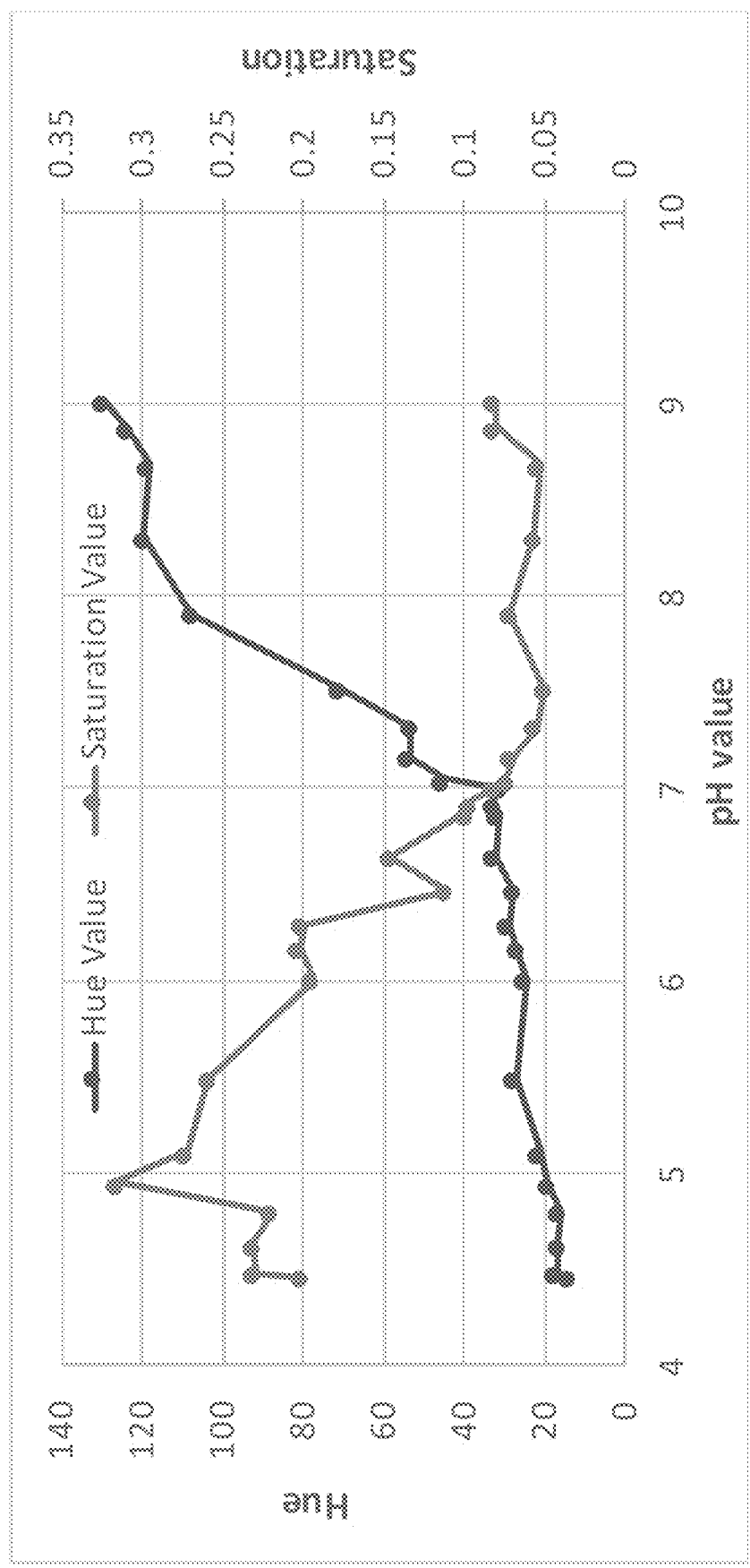
FIG. 2 plots both the hue and saturation values versus the pH values as results of an exemplary RHA assay.
Figure 3:
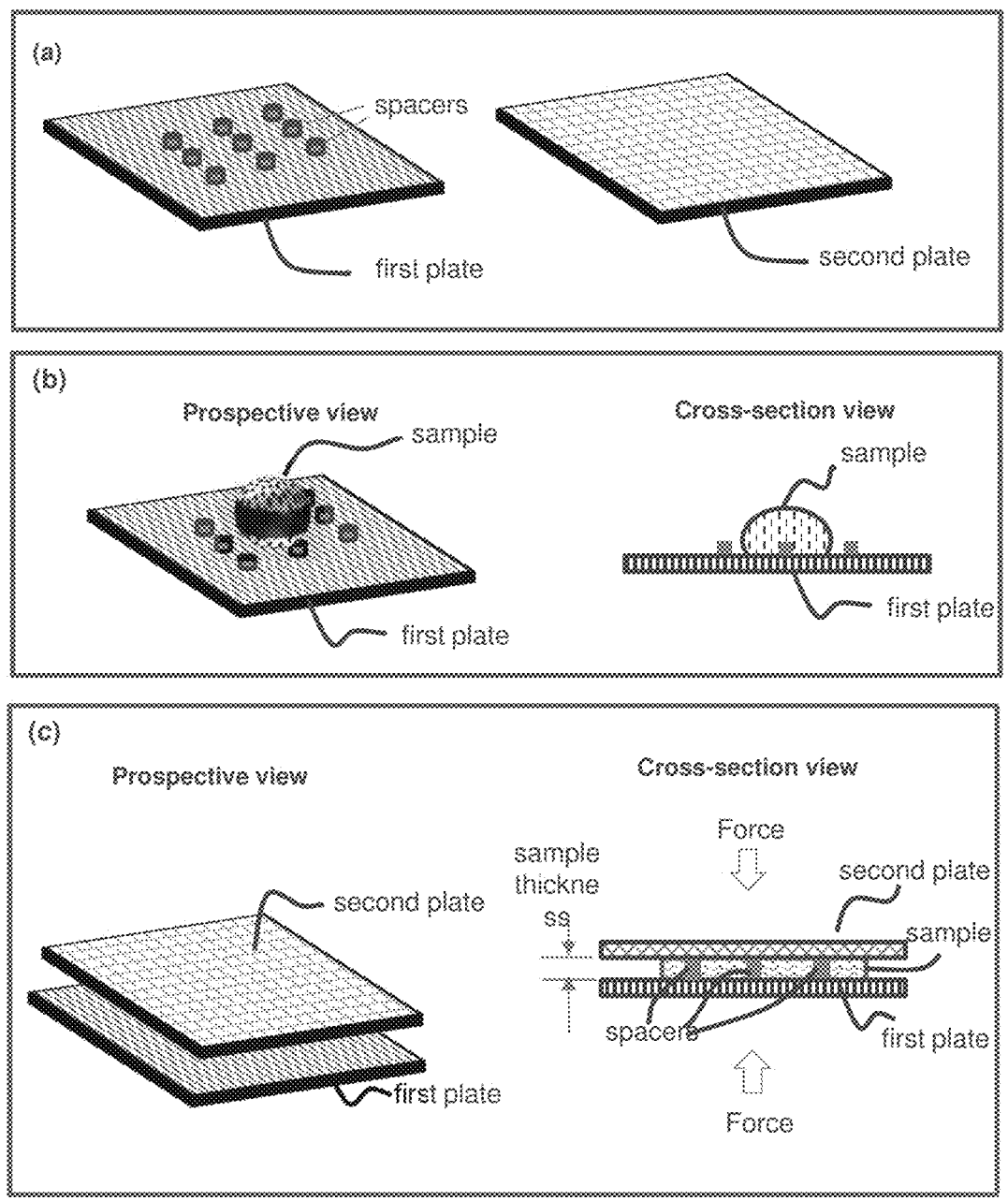
FIG. 3 is an illustration of a CROF (Compressed Regulated Open Flow) embodiment. Panel (a) illustrates a first plate and a second plate wherein the first plate has spacers. Panel (b) illustrates depositing a sample on the first plate (shown), or the second plate (not shown), or both (not shown) at an open configuration. Panel (c) illustrates (i) using the two plates to spread the sample (the sample flow between the plates) and reduce the sample thickness, and (ii) using the spacers and the plate to regulate the sample thickness at the closed configuration. The inner surface of each plate may have one or a plurality of binding sites and or storage sites (not shown).

FIG. 1 panel (B) is a picture of pH QMAX cards applied with a series of pH standard solutions. To establish the standard curve, pH standards were purchased and mixed to achieve a series of solutions with various pH values (the exact values determined by a standard pH meter). As shown in the picture, the pH QMAX cards show a gradient color change from the top left to the bottom right as the pH values of the pH standard solutions applied on each of them changed gradually. FIG. 1 panel (C) shows the extracted areas during image analysis from the images taken as shown in panel (B). These extracted areas are the areas where the pH standard solution reaches the pH indicators and changes the color of the indicators. The Hue and saturation value were used for analysis. Table 2 below shows the hue and saturation values calculated for each pH standard solution tested by the pH QMAX cards, and FIG. 2 plots both values versus the pH values.

As demonstrated by the experiment, a recipe for pH measurement was developed, which is suitable for pH range from 3.0-13.0 (covering all the bodily fluids. And, an efficient preparation method of the pH QMAX card was developed. Moreover, it was demonstrated that using preliminary image analysis method, correlation of Hue and Saturation values against pH value was noticed.

TABLE 2

| Hue and Saturation Values | | |
|---|---|---|
| pH | Hue | Saturation |
| 4.46 | 13.6 | 0.201 |
| 4.48 | 16.9 | 0.229 |
| 4.63 | 16.5 | 0.231 |
| 4.8 | 15.85 | 0.219 |
| 4.95 | 19.22 | 0.316 |
| 5.11 | 21.19 | 0.272 |
| 5.49 | 27.11 | 0.258 |
| 6.01 | 24.43 | 0.193 |
| 6.17 | 26.57 | 0.202 |
| 6.29 | 28.68 | 0.2 |
| 6.47 | 27.62 | 0.111 |
| 6.65 | 32.33 | 0.145 |
| 6.87 | 31.29 | 0.099 |
| 6.92 | 32.76 | 0.096 |
| 7 | 30.84 | 0.082 |
| 7.05 | 44.8 | 0.073 |
| 7.16 | 53.28 | 0.07 |
| 7.32 | 53.14 | 0.055 |
| 7.52 | 70.7 | 0.049 |

TABLE 2-continued

Hue and Saturation Values

| pH | Hue | Saturation |
|---|---|---|
| 7.91 | 107.59 | 0.071 |
| 8.31 | 119.43 | 0.056 |
| 8.68 | 118.22 | 0.053 |
| 8.88 | 123.88 | 0.08 |
| 9.01 | 129.44 | 0.081 |

Artificial Intelligence and/or Machine Learning to Improve Imaging in pH Value Testing In certain embodiments of the present invention, the images taken during an assay operation and/or the samples measured by an assay are analyzed by artificial intelligence and machine learning. The samples include, but not limited to, medical samples, biology samples, environmental samples and chemistry samples.

In certain embodiments of the present invention, the sample is held by a QMAX device. The QMAX device together with imaging plus artificial intelligence and/or machine learning can overcome certain limitations in prior arts.

One important aspect of the present invention is to provide a machine learning framework to enhance the functionality, application scope and the accuracy in assaying using QMAX device, especially when a computer program is used.

In certain embodiments of the present invention, a device and a method for assaying sample and/or assay operation (e.g. tracking label identification) that utilizes QMAX together with imaging plus a machine learning and/or artificial intelligence comprises:

(1) using a QMAX device that has an auxiliary structure in the form of pillars to precisely control the distribution and volume of the sample in assaying, wherein the sample for assaying is loaded into the QMAX device and is kept between the two parallel plates on the QMAX device with an upper plate being transparent for imaging by an imager;

(2) the gap between the two parallel plates in the QMAX device is spaced narrowly—with the distance of the gap being proportional to the size of the analytes to be assayed—by which the analytes in the sample form a single layer between the said plates that can be imaged by an imager on the QMAX device;

(3) the sample volume corresponding to the AoI (area-of-interest) on the upper plate of the QMAX device can be precisely characterized by AoI and the gap—because of the uniformity of the gap between the plates in the QMAX device;

(4) the image on the sample for assaying sandwiched between the AoI x gap in the QMAX device is a pseudo-2D image, because it has the appearance of a 2D image, but it is an image of a 3D sample with its depth being known priori or characterized through other means;

(5) the captured pseudo-2D sample image taken over the AoI of the QMAX device can characterize the location of the analytes, color, shape, counts, and concentration of the analytes in the sample for assaying;

(6) based on abovementioned properties, the captured pseudo-2D image of QMAX device for assaying is amendable to a machine learning framework that applies to analyte detection, localization, identification, segmentation, counting, etc. for assaying in various applications; or (7) any combination of thereof.

In certain embodiments of the present invention, a machine learning framework for QMAX based devices are implemented into a device that is capable of running an algorithms such as deep learning to discriminatively locate, identify, segment and count analytes (e.g. blood cells) based on the pseudo-2D image captured by the QMAX imager.

In certain embodiments of the present invention, the machine learning improves the images captured by the imager on the QMAX device and reduces the effects of noise and artifacts—including and not limited to air bobbles, dusts, shadows, and pillars.

In certain embodiments of the present invention, the training of machine learning uses the spacers of the QMAX card to reduce the data size of training set.

3. Examples

In certain embodiments of the present disclosure, a device for rapid pH measurement can comprise a first plate, a second plate, and spacers. In certain embodiments of the present disclosure, the plates are movable relative to each other into different configurations, including an open configuration and a closed configuration. In certain embodiments of the present disclosure, each of the plates has, on its respective inner surface, a sample contact area for contacting a liquid sample. In certain embodiments of the present disclosure, one or both of the plates comprise the spacers, at least one of the spacers is inside the sample contact area, and the spacers have a predetermined substantially uniform height. In certain embodiments of the present disclosure, one or both of the plates comprise, on the respective inner surface, a pH indicator that, upon contacting the sample, exhibits color indicative of pH value of the sample. In certain embodiments of the present disclosure, the open configuration, the two plates are partially or entirely separated apart, the spacing between the plates is not regulated by the spacers, and the sample is deposited on one or both of the plates. In certain embodiments of the present disclosure, in the closed configuration, which is configured after deposition of the sample in the open configuration: at least part of the sample is compressed by the two plates into a layer of highly uniform thickness, the uniform thickness of the layer is confined by the inner surfaces of the plates and is regulated by the plates.

In certain embodiments of the present disclosure, a system for rapid pH measurement can comprise a device of embodiment A1. In certain embodiments of the present disclosure, a system for rapid pH measurement can comprise a detector that detects the color of the pH indicator in the layer of uniform thickness.

In certain embodiments of the present disclosure, a smartphone system for rapid homogenous assay can comprise a device of the present disclosure. In certain embodiments of the present disclosure, a smartphone system for rapid homogenous assay can comprise a mobile communication. In certain embodiments, the mobile communication device can comprise one or a plurality of cameras for detecting and/or imaging the sample; and/or electronics, signal processors, hardware and software for receiving and/or processing the detected signal and/or the image of the sample and for remote communication. In certain embodiments of the present disclosure, a smartphone system for rapid homogenous assay can comprise an adaptor that is configured to hold the closed device and engageable to mobile communication device. In certain embodiments, when engaged with the mobile communication device, the adaptor is configured to facilitate the detection and/or imaging of the sample at the closed configuration.

In certain embodiments of the present disclosure, a method of performing a rapid homogenous assay can comprise obtaining a liquid sample. In certain embodiments of the present disclosure, a method of performing a rapid homogenous assay can comprise obtaining a device of the present disclosure. In certain embodiments of the present disclosure, a method of performing a rapid homogenous assay can comprise depositing the sample on one or both of the plates when the plates are in the open configuration. In certain embodiments of the present disclosure, a method of performing a rapid homogenous assay can comprise bringing the two plates together and pressing the plates into the closed configuration. In certain embodiments of the present disclosure, a method of performing a rapid homogenous assay can comprise, while the plates are at the closed configuration, detecting and analyzing the color of the pH indicator in the layer of uniform thickness.

In certain embodiments of the present disclosure, a method of analyzing the image for a rapid homogenous assay can comprise obtaining an image of the signal in a device of the present disclosure at the closed configuration. In certain embodiments, the image is selected from the group consisting of bright field image, dark field image, fluorescence image, and phosphorescence image. In certain embodiments of the present disclosure, a method of analyzing the image for a rapid homogenous assay can comprise analyzing the image. In certain embodiments, the pH indicator is coated on beads and the beads are, during a pH value measurements, between two plates. In certain embodiments of the present disclosure, a method of analyzing the image for a rapid homogenous assay can comprise identifying beads in the image. In certain embodiments of the present disclosure, a method of analyzing the image for a rapid homogenous assay can comprise extracting information of beads size, signal intensity of beads, distance between beads, distribution of beads, and/or number of beads. In certain embodiments of the present disclosure, a method of analyzing the image for a rapid homogenous assay can comprise deducing analyte concentration by analyzing the extracted information and/or calculating parameters of the beads.

In certain embodiments of the present disclosure, a method of performing a homogenous assay can comprise obtaining a liquid sample. In certain embodiments of the present disclosure, a method of performing a homogenous assay can comprise obtaining a first and second plates that are movable relative to each other into different configurations, including an open configuration and a closed configuration. In certain embodiments, each of the plates has, on its respective inner surface, a sample contact area for contacting the sample. In certain embodiments, one or both of the plates comprise the spacers, and at least one of the spacers is inside the sample contact area. In certain embodiments, one or both of the plates comprise, on the respective inner surface, a pH indicator that, upon contacting the sample, exhibits color indicative of pH of the sample. In certain embodiments, the spacers have a predetermined substantially uniform height. In certain embodiments of the present disclosure, a method of performing a homogenous assay can comprise depositing the sample on one or both of the plates when the plates are in an open configuration, wherein in the open configuration the two plates are partially or entirely separated apart and the spacing between the plates is not regulated by the spacers. In certain embodiments of the present disclosure, a method of performing a homogenous assay can comprise bringing the two plates together and pressing the plates into a closed configuration, wherein in the closed configuration: at least part of the sample is compressed by the two plates into a layer of highly uniform thickness, the uniform thickness of the layer is confined by the inner surfaces of the two plates and is regulated by the spacers and the plates. In certain embodiments of the present disclosure, a method of performing a homogenous assay can comprise, while the plates are at the closed configuration, detecting and analyzing the color of the pH indicator in the layer of uniform thickness.

In certain embodiments, the pH indicator is at least one selected from the group consisting of Gentian violet (Methyl violet 10B), Malachite green, Thymol blue, Methyl yellow, Bromophenol blue, Congo red, Methyl orange, Methyl Orange-Xylene Cyanol, Screened methyl orange, Bromocresol green, Methyl red, Methyl purple, Azolitmin, Bromocresol purple, Bromothymol blue, Phenol red, Neutral red, Naphtholphthalein, Cresol red, Cresolphthalein, Cresol Purple, Dichlorofluorescein, Phenolphthalein, Thymolphthalein, Alizarine Yellow R, Alizarin Red S, and Indigo carmine. In certain embodiments, the pH indicator comprises Thymol blue, Methyl blue, and Bromothymol blue. In certain embodiments, the pH indicator comprises a mixture of Thymol blue, Methyl blue, and Bromothymol blue in a ratio of 1:2.5:10 by weight. In certain embodiments, one or both of the plates comprise one or more color standards with predetermined color values. In certain embodiments, the pH indicator is substantially uniformly coated on the one or both of the plates. In certain embodiments, the pressing is by human hand. In certain embodiments, at least a portion of the inner surface of one plate or both plates are hydrophilic. In certain embodiments, the inter spacer distance is periodic. In certain embodiments, the sample is deposited directly from a subject onto the plate without using a transferring device. In certain embodiments, after the sample deformation at a closed configuration, the sample maintains the uniform thickness after some or all of a compressing force is removed. In certain embodiments, the spacers have a pillar shape. In certain embodiments, the spacers have a nearly uniform cross-section. In certain embodiments, the spacers have a substantially flat top surface. In certain embodiments, the spacers have a predetermined constant inter-spacer distance. In certain embodiments, the predetermined constant inter-spacer distance is at least about 2 times larger than the size of the analyte. In certain embodiments, the Young's modulus of the spacers times a filling factor of the spacers is equal or larger than 2 MPa. In certain embodiments, the filling factor is the ratio of the spacer contact area to the total plate area. In certain embodiments, the inter spacer distance (SD) is equal or less than about 120 um (micrometer). In certain embodiments, the inter spacer distance (SD) is equal or less than about 100 um (micrometer). In certain embodiments, the fourth power of the inter-spacer-distance (ISD) divided by the thickness (h) and the Young's modulus (E) of the flexible plate (ISD^4/(hE)) is 5×10^6 um^3/GPa or less. In certain embodiments, the fourth power of the inter-spacer-distance (ISD) divided by the thickness (h) and the Young's modulus (E) of the flexible plate (ISD^4/(hE)) is 5×10^5 um^3/GPa or less. In certain embodiments, the spacers have a pillar shape, a substantially flat top surface, a predetermined substantially uniform height, and a predetermined constant inter-spacer distance that is at least about 2 times larger than the size of the analyte, wherein the Young's modulus of the spacers times a filling factor of the spacers is equal or larger than 2 MPa, wherein the filling factor is the ratio of the spacer contact area to the total plate area, and wherein, for each spacer, the ratio of the lateral dimension of the spacer to its height is at least 1 (one). In certain embodiments, the spacers have pillar shape, a substantially flat top surface, a predetermined substantially uniform height, and a predetermined constant inter-spacer distance that is at least about 2 times larger than the size of the analyte, wherein the Young's modulus of the spacers times a filling factor of the spacers is equal or larger than 2 MPa, wherein the filling factor is the ratio of the spacer contact area to the total plate area, and wherein, for each spacer, the ratio of the lateral dimension of the spacer to its height is at least 1 (one), wherein the fourth power of the inter-spacer-distance (ISD) divided by the thickness (h) and the Young's modulus (E) of the flexible plate (ISD^4/(hE)) is 5×10^6 um^3/GPa or less. In certain embodiments, the ratio of the inter-spacing distance of the spacers to the average width of the spacer is 2 or larger, and the filling factor of the spacers multiplied by the Young's modulus of the spacers is 2 MPa or larger. In certain embodiments, the analyte is selected from the group consisting of proteins, peptides, nucleic acids, synthetic compounds, and inorganic compounds. In certain embodiments, the sample is a biological sample selected from amniotic fluid, aqueous humour, vitreous humour, blood, whole blood, fractionated blood, plasma, serum, breast milk, cerebrospinal fluid (CSF), cerumen (earwax), chyle, chime, endolymph, perilymph, feces, breath, gastric acid, gastric juice, lymph, mucus, nasal drainage, phlegm, pericardial fluid, peritoneal fluid, pleural fluid, pus, rheum, saliva, exhaled breath condensates, sebum, semen, sputum, sweat, synovial fluid, tears, vomit, and urine. In certain embodiments, the spacers have a shape of pillars and a ratio of the width to the height of the pillar is equal or larger than one. In certain embodiments, the sample that is deposited on one or both of the plates has an unknown volume. In certain embodiments, the spacers have a shape of pillar, and the pillar has substantially uniform cross-section. In certain embodiments, the sample is for the detection, purification and quantification of chemical compounds or biomolecules that correlates with the stage of certain diseases. In certain embodiments, the sample is obtained from a subject having a condition selected from the group consisting of infectious and parasitic disease, injuries, cardiovascular disease, cancer, mental disorders, neuropsychiatric disorders, pulmonary diseases, renal diseases, and other and organic diseases. In certain embodiments, the method comprises at least one of detection, purification and quantification of a microorganism. In certain embodiments, the sample comprises at least one selected from the group consisting of virus, fungus, bacteria from environment, water, soil, and biological samples. In certain embodiments, the method comprises at least one of detection and quantification of chemical compounds or biological samples that pose hazard to food safety or national security, toxic waste, and anthrax. In certain embodiments, the method comprises quantification of vital parameters in medical or physiological monitor. In certain embodiments, the method comprises measuring at least one of glucose, blood, oxygen level, total blood count. In certain embodiments, the method comprises at least one of detection and quantification of specific DNA or RNA from biosamples. In certain embodiments, the method comprises at least one of sequencing and comparing genetic sequences in DNA in the chromosomes and mitochondria for genome analysis. In certain embodiments, the method comprises detecting reaction products. In certain embodiments, the method comprises detecting reaction products during synthesis or purification of pharmaceuticals. In certain embodiments, the sample comprises at least one selected from the group consisting of cells, tissues, bodily fluids, and stool. In certain embodiments, the sample is the sample in the detection of proteins, peptides, nucleic acids, synthetic compounds, inorganic compounds. In certain embodiments, the sample is the sample in a field selected from the group consisting of human, veterinary, agriculture, foods, environments, and drug testing. In certain embodiments, the sample is a biological sample selected from the group consisting of blood, serum, plasma, a nasal swab, a nasopharyngeal wash, saliva, urine, gastric fluid, spinal fluid, tears, stool, mucus, sweat, earwax, oil, a glandular secretion, cerebral spinal fluid, tissue, semen, vaginal fluid, interstitial fluids derived from tumorous tissue, ocular fluids, spinal fluid, a throat swab, breath, hair, finger nails, skin, biopsy, placental fluid, amniotic fluid, cord blood, lymphatic fluids, cavity fluids, sputum, pus, microbiota, meconium, breast milk, exhaled condensate nasopharyngeal wash, nasal swab, throat swab, stool samples, hair, finger nail, ear wax, breath, connective tissue, muscle tissue, nervous tissue, epithelial tissue, cartilage, cancerous sample, and bone.

Device and Assay with High Uniformity

Flat Top of Pillar Spacers

In certain embodiments of the present disclosure, the spacers are pillars that have a flat top and a foot fixed on one plate, wherein the flat top has a smoothness with a small surface variation, and the variation is less than 5, 10 nm, 20 nm, 30 nm, 50 nm, 100 nm, 200 nm, 300 nm, 400 nm, 500 nm, 600 nm, 700 nm, 800 nm, 1000 nm, or in a range between any two of the values. A preferred flat pillar top smoothness is that surface variation of 50 nm or less.

Furthermore, the surface variation is relative to the spacer height and the ratio of the pillar flat top surface variation to the spacer height is less than 0.5%, 1%, 3%, 5%, 7%, 10%, 15%, 20%, 30%, 40%, or in a range between any two of the values. A preferred flat pillar top smoothness has a ratio of the pillar flat top surface variation to the spacer height is less than 2%, 5%, or 10%.

Sidewall Angle of Pillar Spacers

In certain embodiments of the present disclosure, the spacers are pillars that have a sidewall angle. In certain embodiments, the sidewall angle is less than 5 degrees (measured from the normal of a surface), 10 degrees, 20 degrees, 30 degrees, 40 degrees, 50 degrees, 70 degrees, or in a range between any two of the values. In a preferred embodiment, the sidewall angle is less 5 degrees, 10 degrees, or 20 degrees.

Formation of Uniform Thin Fluidic Layer by an Imprecise Force Pressing

In certain embodiment of the present disclosure, a uniform thin fluidic sample layer is formed by using a pressing with an imprecise force. The term "imprecise pressing force" without adding the details and then adding a definition for imprecise pressing force. As used herein, the term "imprecise" in the context of a force (e.g. "imprecise pressing force") refers to a force that (a) has a magnitude that is not precisely known or precisely predictable at the time the force is applied; (b) has a pressure in the range of 0.01 kg/cm$^2$ (centimeter square) to 100 kg/cm$^2$, (c) varies in magnitude from one application of the force to the next; and (d) the imprecision (i.e. the variation) of the force in (a) and (c) is at least 20% of the total force that actually is applied.

An imprecise force can be applied by human hand, for example, e.g., by pinching an object together between a thumb and index finger, or by pinching and rubbing an object together between a thumb and index finger.

In certain embodiments, the imprecise force by the hand pressing has a pressure of 0.01 kg/cm2, 0.1 kg/cm2, 0.5 kg/cm2, 1 kg/cm2, 2 kg/cm2, kg/cm2, 5 kg/cm2, 10 kg/cm2, 20 kg/cm2, 30 kg/cm2, 40 kg/cm2, 50 kg/cm2, 60 kg/cm2, 100 kg/cm2, 150 kg/cm2, 200 kg/cm2, or a range between any two of the values; and a preferred range of 0.1 kg/cm2 to 0.5 kg/cm2, 0.5 kg/cm2 to 1 kg/cm2, 1 kg/cm2 to 5 kg/cm2, 5 kg/cm2 to 10 kg/cm2 (Pressure).

Spacer Filling Factor.

The term "spacer filling factor" or "filling factor" refers to the ratio of the spacer contact area to the total plate area", wherein the spacer contact area refers, at a closed configuration, the contact area that the spacer's top surface contacts to the inner surface of a plate, and the total plate area refers the total area of the inner surface of the plate that the flat top of the spacers contact. Since there are two plates and each spacer has two contact surfaces each contacting one plate, the filling fact is the filling factor of the smallest.

For example, if the spacers are pillars with a flat top of a square shape (10 um×10 um), a nearly uniform cross-section and 2 um tall, and the spacers are periodic with a period of 100 um, then the filing factor of the spacer is 1%. If in the above example, the foot of the pillar spacer is a square shape of 15 um×15 um, then the filling factor is still 1% by the definition.

IDS^4/hE

In certain embodiments of the present disclosure, a device for forming a thin fluidic sample layer with a uniform predetermined thickness by pressing can comprise a first plate. In certain embodiments of the present disclosure, a device for forming a thin fluidic sample layer with a uniform predetermined thickness by pressing can comprise a second plate. In certain embodiments of the present disclosure, a device for forming a thin fluidic sample layer with a uniform predetermined thickness by pressing can comprise spacers. In certain embodiments, the plates are movable relative to each other into different configurations. In certain embodiments, one or both plates are flexible. In certain embodiments, each of the plates comprises an inner surface that has a sample contact area for contacting a fluidic sample. In certain embodiments, each of the plates comprises, on its respective outer surface, a force area for applying a pressing force that forces the plates together. In certain embodiments, one or both of the plates comprise the spacers that are permanently fixed on the inner surface of a respective plate. In certain embodiments, the spacers have a predetermined substantially uniform height that is equal to or less than 200 microns, and a predetermined fixed inter-spacer-distance. In certain embodiments, the fourth power of the inter-spacer-distance (ISD) divided by the thickness (h) and the Young's modulus (E) of the flexible plate (ISD$^4$/(hE)) is 5×10$^6$ um$^3$/GPa or less. In certain embodiments, at least one of the spacers is inside the sample contact area. In certain embodiments, one of the configurations is an open configuration, in which: the two plates are partially or completely separated apart, the spacing between the plates is not regulated by the spacers, and the sample is deposited on one or both of the plates. In certain embodiments, another of the configurations is a closed configuration which is configured after the sample is deposited in the open configuration and the plates are forced to the closed configuration by applying the pressing force on the force area; and in the closed configuration: at least part of the sample is compressed by the two plates into a layer of highly uniform thickness and is substantially stagnant relative to the plates, wherein the uniform thickness of the layer is confined by the sample contact areas of the two plates and is regulated by the plates and the spacers.

In certain embodiments of the present disclosure, a method of forming a thin fluidic sample layer with a uniform predetermined thickness by pressing can comprise obtaining a device of the present disclosure. In certain embodiments of the present disclosure, a method of forming a thin fluidic sample layer with a uniform predetermined thickness by pressing can comprise depositing a fluidic sample on one or both of the plates when the plates are configured in an open configuration. In certain embodiments, the open configuration is a configuration in which the two plates are partially or completely separated apart and the spacing between the plates is not regulated by the spacers. In certain embodiments of the present disclosure, a method of forming a thin fluidic sample layer with a uniform predetermined thickness by pressing can comprise forcing the two plates into a closed configuration, in which: at least part of the sample is compressed by the two plates into a layer of substantially uniform thickness, wherein the uniform thickness of the layer is confined by the sample contact surfaces of the plates and is regulated by the plates and the spacers.

In certain embodiments of the present disclosure, a device for analyzing a fluidic sample can comprise a first plate. In certain embodiments of the present disclosure, a device for analyzing a fluidic sample can comprise a second plate. In certain embodiments of the present disclosure, a device for analyzing a fluidic sample can comprise spacers. In certain embodiments, the plates are movable relative to each other into different configurations. In certain embodiments, one or both plates are flexible. In certain embodiments, each of the plates has, on its respective inner surface, a sample contact area for contacting a fluidic sample. In certain embodiments, one or both of the plates comprise the spacers and the spacers are fixed on the inner surface of a respective plate. In certain embodiments, the spacers have a predetermined substantially uniform height that is equal to or less than 200 microns, and the inter-spacer-distance is predetermined. In certain embodiments, the Young's modulus of the spacers multiplied by the filling factor of the spacers is at least 2 MPa. In certain embodiments, at least one of the spacers is inside the sample contact area. In certain embodiments, one of the configurations is an open configuration, in which: the two plates are partially or completely separated apart, the spacing between the plates is not regulated by the spacers, and the sample is deposited on one or both of the plates. In certain embodiments, another of the configurations is a closed configuration which is configured after the sample is deposited in the open configuration; and in the closed configuration: at least part of the sample is compressed by the two plates into a layer of highly uniform thickness, wherein the uniform thickness of the layer is confined by the sample contact surfaces of the plates and is regulated by the plates and the spacers.

In certain embodiments of the present disclosure, a method of forming a thin fluidic sample layer with a uniform predetermined thickness by pressing can comprise obtaining a device of the present disclosure. In certain embodiments of the present disclosure, a method of forming a thin fluidic sample layer with a uniform predetermined thickness by pressing can comprise depositing a fluidic sample on one or both of the plates when the plates are configured in an open configuration. In certain embodiments, the open configuration is a configuration in which the two plates are partially or completely separated apart and the spacing between the plates is not regulated by the spacers. In certain embodiments of the present disclosure, a method of forming a thin fluidic sample layer with a uniform predetermined thickness by pressing can comprise forcing the two plates into a closed configuration. In certain embodiments, at least part of the sample is compressed by the two plates into a layer of substantially uniform thickness, wherein the uniform thickness of the layer is confined by the sample contact surfaces of the plates and is regulated by the plates and the spacers.

In certain embodiments of the present disclosure, a device for analyzing a fluidic sample can comprise a first plate. In certain embodiments of the present disclosure, a device for analyzing a fluidic sample can comprise a second plate. In certain embodiments, the plates are movable relative to each other into different configurations. In certain embodiments, one or both plates are flexible. In certain embodiments, each of the plates has, on its respective surface, a sample contact area for contacting a sample that contains an analyte. In certain embodiments, one or both of the plates comprise spacers that are permanently fixed to a plate within a sample contact area, wherein the spacers have a predetermined substantially uniform height and a predetermined fixed inter-spacer distance that is at least about 2 times larger than the size of the analyte, up to 200 um, and wherein at least one of the spacers is inside the sample contact area. In certain embodiments, one of the configurations is an open configuration, in which: the two plates are separated apart, the spacing between the plates is not regulated by the spacers, and the sample is deposited on one or both of the plates. In certain embodiments, another of the configurations is a closed configuration which is configured after the sample deposition in the open configuration; and in the closed configuration: at least part of the sample is compressed by the two plates into a layer of highly uniform thickness, wherein the uniform thickness of the layer is confined by the sample contact surfaces of the plates and is regulated by the plates and the spacers.

In certain embodiments of the present disclosure, a method of forming a thin fluidic sample layer with a uniform predetermined thickness by pressing can comprise obtaining a device of the present disclosure. In certain embodiments of the present disclosure a method of forming a thin fluidic sample layer with a uniform predetermined thickness by pressing can comprise depositing a fluidic sample on one or both of the plates; when the plates are configured in an open configuration, wherein the open configuration is a configuration in which the two plates are partially or completely separated apart and the spacing between the plates is not regulated by the spacers. In certain embodiments of the present disclosure a method of forming a thin fluidic sample layer with a uniform predetermined thickness by pressing can comprise forcing the two plates into a closed configuration, in which: at least part of the sample is compressed by the two plates into a layer of substantially uniform thickness, wherein the uniform thickness of the layer is confined by the sample contact surfaces of the plates and is regulated by the plates and the spacers.

In certain embodiments of the present disclosure, a device for forming a thin fluidic sample layer with a uniform predetermined thickness by pressing can comprise a first plate. In certain embodiments of the present disclosure, a device for forming a thin fluidic sample layer with a uniform predetermined thickness by pressing can comprise a second plate. In certain embodiments of the present disclosure, a device for forming a thin fluidic sample layer with a uniform predetermined thickness by pressing can comprise spacers. In certain embodiments, the plates are movable relative to each other into different configurations. In certain embodiments, one or both plates are flexible. In certain embodiments, each of the plates comprises, on its respective inner surface, a sample contact area for contacting and/or compressing a fluidic sample. In certain embodiments, each of the plates comprises, on its respective outer surface, an area for applying a force that forces the plates together. In certain embodiments, one or both of the plates comprise the spacers that are permanently fixed on the inner surface of a respective plate. In certain embodiments, the spacers have a predetermined substantially uniform height that is equal to or less than 200 microns, a predetermined width, and a predetermined fixed inter-spacer-distance. In certain embodiments, a ratio of the inter-spacer-distance to the spacer width is 1.5 or larger. In certain embodiments, at least one of the spacers is inside the sample contact area. In certain embodiments, one of the configurations is an open configuration, in which: the two plates are partially or completely separated apart, the spacing between the plates is not regulated by the spacers, and the sample is deposited on one or both of the plates. In certain embodiments, another of the configurations is a closed configuration which is configured after the sample deposition in the open configuration; and in the closed configuration: at least part of the sample is compressed by the two plates into a layer of highly uniform thickness and is substantially stagnant relative to the plates, wherein the uniform thickness of the layer is confined by the sample contact areas of the two plates and is regulated by the plates and the spacers.

In certain embodiments of the present disclosure, a method of forming a thin fluidic sample layer with a uniform predetermined thickness by pressing with an imprecise pressing force can comprise obtaining a device of the present disclosure. In certain embodiments of the present disclosure, a method of forming a thin fluidic sample layer with a uniform predetermined thickness by pressing with an imprecise pressing force can comprise obtaining a fluidic sample. In certain embodiments of the present disclosure, a method of forming a thin fluidic sample layer with a uniform predetermined thickness by pressing with an imprecise pressing force can comprise depositing the sample on one or both of the plates; when the plates are configured in an open configuration, wherein the open configuration is a configuration in which the two plates are partially or completely separated apart and the spacing between the plates is not regulated by the spacers. In certain embodiments of the present disclosure, a method of forming a thin fluidic sample layer with a uniform predetermined thickness by pressing with an imprecise pressing force can comprise forcing the two plates into a closed configuration, in which: at least part of the sample is compressed by the two plates into a layer of substantially uniform thickness, wherein the uniform thickness of the layer is confined by the sample contact surfaces of the plates and is regulated by the plates and the spacers.

In certain embodiments, the spacers have a shape of pillar with a foot fixed on one of the plates and a flat top surface for contacting the other plate. In certain embodiments, the spacers have a shape of pillar with a foot fixed on one of the plates, a flat top surface for contacting the other plate, substantially uniform cross-section. In certain embodiments, the spacers have a shape of pillar with a foot fixed on one of the plates and a flat top surface for contacting the other plate, wherein the flat top surface of the pillars has a variation in less than 10 nm. In certain embodiments, the spacers have a shape of pillar with a foot fixed on one of the plates and a flat top surface for contacting the other plate, wherein the flat top surface of the pillars has a variation in less than 50 nm. In certain embodiments, the spacers have a shape of pillar with a foot fixed on one of the plates and a flat top surface for contacting the other plate, wherein the flat top surface of the pillars has a variation in less than 50 nm. In certain embodiments, the spacers have a shape of pillar with a foot fixed on one of the plates and a flat top surface for contacting the other plate, wherein the flat top surface of the pillars has a variation in less than 10 nm, 20 nm, 30 nm, 100 nm, 200 nm, or in a range of any two of the values.

In certain embodiments, the Young's modulus of the spacers multiplied by the filling factor of the spacers is at least 2 MPa. In certain embodiments, the sample comprises an analyte and the predetermined constant inter-spacer distance is at least about 2 times larger than the size of the analyte, up to 200 um. In certain embodiments, the sample comprise an analyte, the predetermined constant inter-spacer distance is at least about 2 times larger than the size of the analyte, up to 200 um, and the Young's modulus of the spacers multiplied by the filling factor of the spacers is at least 2 MPa.

In certain embodiments, a fourth power of the inter-spacer-distance (IDS) divided by the thickness (h) and the Young's modulus (E) of the flexible plate (ISD^4/(hE)) is 5×10^6 um^3/GPa or less. In certain embodiments, a fourth power of the inter-spacer-distance (IDS) divided by the thickness and the Young's modulus of the flexible plate (ISD^4/(hE)) is 1×10^6 um^3/GPa or less. In certain embodiments, a fourth power of the inter-spacer-distance (IDS) divided by the thickness and the Young's modulus of the flexible plate (ISD^4/(hE)) is 5×10^5 um^3/GPa or less. In certain embodiments, the Young's modulus of the spacers multiplied by the filling factor of the spacers is at least 2 MPa, and a fourth power of the inter-spacer-distance (IDS) divided by the thickness and the Young's modulus of the flexible plate (ISD^4/(hE)) is 1×10^5 um^3/GPa or less. In certain embodiments, the Young's modulus of the spacers multiplied by the filling factor of the spacers is at least 2 MPa, and a fourth power of the inter-spacer-distance (IDS) divided by the thickness and the Young's modulus of the flexible plate (ISD^4/(hE)) is 1×10^4 um^3/GPa or less. In certain embodiments, the Young's modulus of the spacers multiplied by the filling factor of the spacers is at least 20 MPa.

In certain embodiments of the present disclosure, the ratio of the inter-spacing distance of the spacers to the average width of the spacer is 2 or larger. In certain embodiments, the ratio of the inter-spacing distance of the spacers to the average width of the spacer is 2 or larger, and the Young's modulus of the spacers multiplied by the filling factor of the spacers is at least 2 MPa. In certain embodiments, the inter-spacer distance that is at least about 2 times larger than the size of the analyte, up to 200 um. In certain embodiments, a ratio of the inter-spacer-distance to the spacer width is 1.5 or larger. In certain embodiments, a ratio of the width to the height of the spacer is 1 or larger. In certain embodiments, a ratio of the width to the height of the spacer is 1.5 or larger. In certain embodiments, a ratio of the width to the height of the spacer is 2 or larger. In certain embodiments, a ratio of the width to the height of the spacer is larger than 2, 3, 5, 10, 20, 30, 50, or in a range of any two the value.

In certain embodiments, a force that presses the two plates into the closed configuration is an imprecise pressing force. In certain embodiments, a force that presses the two plates into the closed configuration is an imprecise pressing force provided by human hand. In certain embodiments, the forcing of the two plates to compress at least part of the sample into a layer of substantially uniform thickness comprises a use of a conformable pressing, either in parallel or sequentially, an area of at least one of the plates to press the plates together to a closed configuration, wherein the conformable pressing generates a substantially uniform pressure on the plates over the at least part of the sample, and the pressing spreads the at least part of the sample laterally between the sample contact surfaces of the plates, and wherein the closed configuration is a configuration in which the spacing between the plates in the layer of uniform thickness region is regulated by the spacers; and wherein the reduced thickness of the sample reduces the time for mixing the reagents on the storage site with the sample. In certain embodiments, the pressing force is an imprecise force that has a magnitude which is, at the time that the force is applied, either (a) unknown and unpredictable, or (b) cannot be known and cannot be predicted within an accuracy equal or better than 20% of the average pressing force applied. In certain embodiments, the pressing force is an imprecise force that has a magnitude which is, at the time that the force is applied, either (a) unknown and unpredictable, or (b) cannot be known and cannot be predicted within an accuracy equal or better than 30% of the average pressing force applied. In certain embodiments, the pressing force is an imprecise force that has a magnitude which is, at the time that the force is applied, either (a) unknown and unpredictable, or (b) cannot be known and cannot be predicted within an accuracy equal or better than 30% of the average pressing force applied; and wherein the layer of highly uniform thickness has a variation in thickness uniform of 20% or less. In certain embodiments, the pressing force is an imprecise force that has a magnitude which cannot, at the time that the force is applied, be determined within an accuracy equal or better than 30%, 40%, 50%, 70%, 100%, 200%, 300%, 500%, 1000%, 2000%, or in a range between any of the two values.

In certain embodiments of the present disclosure, the flexible plate has a thickness of in the range of 10 um to 200 um. In certain embodiments, the flexible plate has a thickness of in the range of 20 um to 100 um. In certain embodiments, the flexible plate has a thickness of in the range of 25 um to 180 um. In certain embodiments, the flexible plate has a thickness of in the range of 200 um to 260 um. In certain embodiments, the flexible plate has a thickness of equal to or less than 250 um, 225 um, 200 um, 175 um, 150 um, 125 um, 100 um, 75 um, 50 um, 25 um, 10 um, 5 um, 1 um, or in a range between the two of the values. In certain embodiments, the sample has a viscosity in the range of 0.1 to 4 (mPa s). In certain embodiments, the flexible plate has a thickness of in the range of 200 um to 260 um. In certain embodiments, the flexible plate has a thickness in the range of 20 um to 200 um and Young's modulus in the range 0.1 to 5 GPa.

In certain embodiments of the present disclosure, the sample deposition is a deposition directly from a subject to the plate without using any transferring devices. In certain embodiments, during the deposition, the amount of the sample deposited on the plate is unknown. In certain embodiments, the method further comprises an analyzing that analyze the sample. In certain embodiments, the analyzing comprises calculating the volume of a relevant sample volume by measuring the lateral area of the relevant sample volume and calculating the volume from the lateral area and the predetermined spacer height. In certain embodiments, the pH value at location of a sample that is between the two plates in a closed configuration is determined by the volume of the location and by analyzing an image(s) taken from that location. In certain embodiments, the determination by analyzing an image uses artificial intelligence and machine learning.

In certain embodiments, the analyzing step (e) comprises measuring: i. imaging, ii. luminescence selected from photoluminescence, electroluminescence, and electrochemiluminescence, iii. surface Raman scattering, iv. electrical impedance selected from resistance, capacitance, and inductance, or v. any combination of i-iv. In certain embodiments, the analyzing comprises reading, image analysis, or counting of the analyte, or a combination of thereof. In certain embodiments, the sample contains one or plurality of analytes, and one or both plate sample contact surfaces comprise one or a plurality of binding sites that each binds and immobilize a respective analyte. In certain embodiments, one or both plate sample contact surfaces comprise one or a plurality of storage sites that each stores a reagent or reagents, wherein the reagent(s) dissolve and diffuse in the sample. In certain embodiments, one or both plate sample contact surfaces comprises one or a plurality of amplification sites that are each capable of amplifying a signal from the analyte or a label of the analyte when the analyte or label is within 500 nm from an amplification site. In certain embodiments, i. one or both plate sample contact surfaces comprise one or a plurality of binding sites that each binds and immobilize a respective analyte; or ii. one or both plate sample contact surfaces comprise, one or a plurality of storage sites that each stores a reagent or reagents; wherein the reagent(s) dissolve and diffuse in the sample, and wherein the sample contains one or plurality of analytes; or iii. one or a plurality of amplification sites that are each capable of amplifying a signal from the analyte or a label of the analyte when the analyte or label is 500 nm from the amplification site; or iv. any combination of i to iii.

In certain embodiments, the liquid sample is a biological sample selected from amniotic fluid, aqueous humour, vitreous humour, blood (e.g., whole blood, fractionated blood, plasma or serum), breast milk, cerebrospinal fluid (CSF), cerumen (earwax), chyle, chime, endolymph, perilymph, feces, breath, gastric acid, gastric juice, lymph, mucus (including nasal drainage and phlegm), pericardial fluid, peritoneal fluid, pleural fluid, pus, rheum, saliva, exhaled breath condensates, sebum, semen, sputum, sweat, synovial fluid, tears, vomit, and urine.

In certain embodiments, the layer of uniform thickness in the closed configuration is less than 150 um. In certain embodiments, the pressing is provided by a pressured liquid, a pressed gas, or a conformal material. In certain embodiments, the analyzing comprises counting cells in the layer of uniform thickness. In certain embodiments, the analyzing comprises performing an assay in the layer of uniform thickness. In certain embodiments, In certain embodiments, the assay is a binding assay or biochemical assay. In certain embodiments, the sample deposited has a total volume less 0.5 uL. In certain embodiments, multiple drops of sample are deposited onto one or both of the plates.

In certain embodiments, the inter-spacer distance is in the range of 1 μm to 120 μm. In certain embodiments, the inter-spacer distance is in the range of 120 μm to 50 μm. In certain embodiments, the inter-spacer distance is in the range of 120 μm to 200 μm. In certain embodiments, the flexible plates have a thickness in the range of 20 um to 250 um and Young's modulus in the range 0.1 to 5 GPa. In certain embodiments, for a flexible plate, the thickness of the flexible plate times the Young's modulus of the flexible plate is in the range 60 to 750 GPa-um.

In certain embodiments, the layer of uniform thickness sample is uniform over a lateral area that is at least 1 mm$^2$. In certain embodiments, the layer of uniform thickness sample is uniform over a lateral area that is at least 3 mm$^2$. In certain embodiments, the layer of uniform thickness sample is uniform over a lateral area that is at least 5 mm$^2$. In certain embodiments, In certain embodiments, the layer of uniform thickness sample is uniform over a lateral area that is at least 10 mm$^2$. In certain embodiments, the layer of uniform thickness sample is uniform over a lateral area that is at least 20 mm$^2$. In certain embodiments, the layer of uniform thickness sample is uniform over a lateral area that is in a range of 20 mm$^2$ to 100 mm$^2$. In certain embodiments, the layer of uniform thickness sample has a thickness uniformity of up to +/−5% or better. In certain embodiments, the layer of uniform thickness sample has a thickness uniformity of up to +1-10% or better. In certain embodiments, the layer of uniform thickness sample has a thickness uniformity of up to +1-20% or better. In certain embodiments, the layer of uniform thickness sample has a thickness uniformity of up to +/−30% or better. In certain embodiments, the layer of uniform thickness sample has a thickness uniformity of up to +/−40% or better. In certain embodiments, the layer of uniform thickness sample has a thickness uniformity of up to +/−50% or better.

In certain embodiments, the spacers are pillars with a cross-sectional shape selected from round, polygonal, circular, square, rectangular, oval, elliptical, or any combination of the same. In certain embodiments, the spacers have pillar shape, have a substantially flat top surface, and have substantially uniform cross-section, wherein, for each spacer, the ratio of the lateral dimension of the spacer to its height is at least 1. In certain embodiments, the inter spacer distance is periodic. In certain embodiments, the spacers have a filling factor of 1% or higher, wherein the filling factor is the ratio of the spacer contact area to the total plate area. In certain embodiments, the Young's modulus of the spacers times the filling factor of the spacers is equal or larger than 20 MPa, wherein the filling factor is the ratio of the spacer contact area to the total plate area. In certain embodiments, the spacing between the two plates at the closed configuration is in less 200 um. In certain embodiments, the spacing between the two plates at the closed configuration is a value selected from between 1.8 um and 3.5 um. In certain embodiments, the spacing are fixed on a plate by directly embossing the plate or injection molding of the plate. In certain embodiments, the materials of the plate and the spacers are selected from polystyrene, PMMA, PC, COC, COP, or another plastic. In certain embodiments, the spacers have a pillar shape, and the sidewall corners of the spacers have a round shape with a radius of curvature at least 1 μm. In certain embodiments, the spacers have a density of at least 1000/mm$^2$. In certain embodiments, at least one of the plates is transparent. In certain embodiments, the mold used to make the spacers is fabricated by a mold containing features that are fabricated by either (a) directly reactive ion etching or ion beam etched or (b) by a duplication or multiple duplication of the features that are reactive ion etched or ion beam etched.

In certain embodiments, the spacers are configured, such that the filling factor is in the range of 1% to 5%. In certain embodiments, the surface variation is relative to the spacer height and the ratio of the pillar flat top surface variation to the spacer height is less than 0.5%, 1%, 3%, 5%, 7%, 10%, 15%, 20%, 30%, 40%, or in a range between any two of the values. A preferred flat pillar top smoothness has a ratio of the pillar flat top surface variation to the spacer height is less than 2%, 5%, or 10%. In certain embodiments, the spacers are configured, such that the filling factor is in the range of 1% to 5%. In certain embodiments, the spacers are configured, such that the filling factor is in the range of 5% to 10%. In certain embodiments, the spacers are configured, such that the filling factor is in the range of 10% to 20%. In certain embodiments, the spacers are configured, such that the filling factor is in the range of 20% to 30%. In certain embodiments, the spacers are configured, such that the filling factor is 5%, 10%, 20%, 30%, 40%, 50%, or in a range of any two of the values. In certain embodiments, the spacers are configured, such that the filling factor is 50%, 60%, 70%, 80%, or in a range of any two of the values.

In certain embodiments, the spacers are configured, such that the filling factor multiplies the Young's modulus of the spacer is in the range of 2 MPa and 10 MPa. In certain embodiments, the spacers are configured, such that the filling factor multiplies the Young's modulus of the spacer is in the range of 10 MPa and 20 MPa. In certain embodiments, the spacers are configured, such that the filling factor multiplies the Young's modulus of the spacer is in the range of 20 MPa and 40 MPa. In certain embodiments, the spacers are configured, such that the filling factor multiplies the Young's modulus of the spacer is in the range of 40 MPa and 80 MPa. In certain embodiments, the spacers are configured, such that the filling factor multiplies the Young's modulus of the spacer is in the range of 80 MPa and 120 MPa. In certain embodiments, the spacers are configured, such that the filling factor multiplies the Young's modulus of the spacer is in the range of 120 MPa to 150 MPa.

In certain embodiments, the device further comprises a dry reagent coated on one or both plates. In certain embodiments, the device further comprises, on one or both plates, a dry binding site that has a predetermined area, wherein the dry binding site binds to and immobilizes an analyte in the sample. In certain embodiments, the device further comprises, on one or both plates, a releasable dry reagent and a release time control material that delays the time that the releasable dry regent is released into the sample. In certain embodiments, the release time control material delays the time that the dry regent starts is released into the sample by at least 3 seconds. In certain embodiments, the regent comprises anticoagulant and/or staining reagent(s). In certain embodiments, the reagent comprises cell lysing reagent(s). In certain embodiments, the device further comprises, on one or both plates, one or a plurality of dry binding sites and/or one or a plurality of reagent sites. In certain embodiments, the analyte comprises a molecule (e.g., a protein, peptides, DNA, RNA, nucleic acid, or other molecule), cells, tissues, viruses, and nanoparticles with different shapes. In certain embodiments, the analyte comprises white blood cells, red blood cells and platelets. In certain embodiments, the analyte is stained.

In certain embodiments, the spacers regulating the layer of uniform thickness have a filling factor of at least 1%, wherein the filling factor is the ratio of the spacer area in contact with the layer of uniform thickness to the total plate area in contact with the layer of uniform thickness. In certain embodiments, for spacers regulating the layer of uniform thickness, the Young's modulus of the spacers times the filling factor of the spacers is equal or larger than 10 MPa, wherein the filling factor is the ratio of the spacer area in contact with the layer of uniform thickness to the total plate area in contact with the layer of uniform thickness. In certain embodiments, for a flexible plate, the thickness of the flexible plate times the Young's modulus of the flexible plate is in the range 60 to 750 GPa-um. In certain embodiments, for a flexible plate, the fourth power of the inter-spacer-distance (ISD) divided by the thickness of the flexible plate (h) and the Young's modulus (E) of the flexible plate, $ISD^4/(hE)$, is equal to or less than $10^6$ um$^3$/GPa.

In certain embodiments, one or both plates comprises a location marker, either on a surface of or inside the plate, that provide information of a location of the plate. In certain embodiments, one or both plates comprises a scale marker, either on a surface of or inside the plate, that provide information of a lateral dimension of a structure of the sample and/or the plate. In certain embodiments, one or both plates comprises an imaging marker, either on surface of or inside the plate, that assists an imaging of the sample. In certain embodiments, the spacers functions as a location marker, a scale marker, an imaging marker, or any combination of thereof.

In certain embodiments, the average thickness of the layer of uniform thickness is about equal to a minimum dimension of an analyte in the sample. In certain embodiments, the inter-spacer distance is in the range of 7 μm to 50 μm. In certain embodiments, the inter-spacer distance is in the range of 50 μm to 120 μm. In certain embodiments, the inter-spacer distance is in the range of 120 μm to 200 μm (micron). In certain embodiments, the inter-spacer distance is substantially periodic. In certain embodiments, the spacers are pillars with a cross-sectional shape selected from round, polygonal, circular, square, rectangular, oval, elliptical, or any combination of the same.

In certain embodiments, the spacers have a pillar shape and have a substantially flat top surface, wherein, for each spacer, the ratio of the lateral dimension of the spacer to its height is at least 1. In certain embodiments, each spacer has the ratio of the lateral dimension of the spacer to its height is at least 1. In certain embodiments, the minimum lateral dimension of spacer is less than or substantially equal to the minimum dimension of an analyte in the sample. In certain embodiments, the minimum lateral dimension of spacer is in the range of 0.5 um to 100 um. In certain embodiments, the minimum lateral dimension of spacer is in the range of 0.5 um to 10 um.

In certain embodiments, the sample is blood. In certain embodiments, the sample is whole blood without dilution by liquid. In certain embodiments, the sample is a biological sample selected from amniotic fluid, aqueous humour, vitreous humour, blood (e.g., whole blood, fractionated blood, plasma or serum), breast milk, cerebrospinal fluid (CSF), cerumen (earwax), chyle, chime, endolymph, perilymph, feces, breath, gastric acid, gastric juice, lymph, mucus (including nasal drainage and phlegm), pericardial fluid, peritoneal fluid, pleural fluid, pus, rheum, saliva, exhaled breath condensates, sebum, semen, sputum, sweat, synovial fluid, tears, vomit, and urine. In certain embodiments, the sample is a biological sample, an environmental sample, a chemical sample, or clinical sample.

In certain embodiments, the spacers have a pillar shape, and the sidewall corners of the spacers have a round shape with a radius of curvature at least 1 μm. In certain embodiments, the spacers have a density of at least 100/mm$^2$. In certain embodiments, the spacers have a density of at least 1000/mm$^2$. In certain embodiments, at least one of the plates is transparent. In certain embodiments, at least one of the plates is made from a flexible polymer. In certain embodiments, for a pressure that compresses the plates, the spacers are not compressible and/or, independently, only one of the plates is flexible. In certain embodiments, the flexible plate has a thickness in the range of 10 um to 200 um. In certain embodiments, the variation is less than 30%. In certain embodiments, the variation is less than 10%. In certain embodiments, the variation is less than 5%.

In certain embodiments, the first and second plates are connected and are configured to be changed from the open configuration to the closed configuration by folding the plates. In certain embodiments, the first and second plates are connected by a hinge and are configured to be changed from the open configuration to the closed configuration by folding the plates along the hinge. In certain embodiments, the first and second plates are connected by a hinge that is a separate material to the plates, and are configured to be changed from the open configuration to the closed configuration by folding the plates along the hinge. In certain embodiments, the first and second plates are made in a single piece of material and are configured to be changed from the open configuration to the closed configuration by folding the plates. In certain embodiments, the layer of uniform thickness sample is uniform over a lateral area that is at least 1 mm$^2$.

In certain embodiments, the device is configured to analyze the sample in 60 seconds or less. In certain embodiments, at the closed configuration, the final sample thickness device is configured to analyze the sample in 60 seconds or less. In certain embodiments, at the closed configuration, the final sample thickness device is configured to analyze the sample in 10 seconds or less.

In certain embodiments, the dry binding site comprises a capture agent. In certain embodiments, the dry binding site comprises an antibody or nucleic acid. In certain embodiments, the releasable dry reagent is a labeled reagent. In certain embodiments, the releasable dry reagent is a fluorescently-labeled reagent. In certain embodiments, the releasable dry reagent is a fluorescently-labeled antibody. In certain embodiments, the releasable dry reagent is a cell stain. In certain embodiments, the releasable dry reagent is a cell lysing.

In certain embodiments, the detector is an optical detector that detects an optical signal. In certain embodiments, the detector is an electric detector that detect electrical signal. In certain embodiments, the spacing are fixed on a plate by directly embossing the plate or injection molding of the plate. In certain embodiments, the materials of the plate and the spacers are selected from polystyrene, PMMA, PC, COC, COP, or another plastic.

In certain embodiments of the present disclosure, a system for rapidly analyzing a sample using a mobile phone can comprise a device of any prior embodiment. In certain embodiments of the present disclosure, a system for rapidly analyzing a sample using a mobile phone can comprise a mobile communication device. In certain embodiments, the mobile communication device can comprise one or a plurality of cameras for the detecting and/or imaging the sample. In certain embodiments, the mobile communication device can comprise electronics, signal processors, hardware and software for receiving and/or processing the detected signal and/or the image of the sample and for remote communication. In certain embodiments, the mobile communication device can comprise a light source from either the mobile communication device or an external source. In same embodiments, the detector in the devices or methods of any prior embodiment is provided by the mobile communication device, and detects an analyte in the sample at the closed configuration.

In certain embodiments, one of the plates has a binding site that binds an analyte, wherein at least part of the uniform sample thickness layer is over the binding site, and is substantially less than the average lateral linear dimension of the binding site. In certain embodiments, any system of the present disclosure can comprise a housing configured to hold the sample and to be mounted to the mobile communication device. In certain embodiments, the housing comprises optics for facilitating the imaging and/or signal processing of the sample by the mobile communication device, and a mount configured to hold the optics on the mobile communication device. In certain embodiments, an element of the optics in the housing is movable relative to the housing. In certain embodiments, the mobile communication device is configured to communicate test results to a medical professional, a medical facility or an insurance company. In certain embodiments, the mobile communication device is further configured to communicate information on the test and the subject with the medical professional, medical facility or insurance company. In certain embodiments, the mobile communication device is further configured to communicate information of the test to a cloud network, and the cloud network process the information to refine the test results. In certain embodiments, the mobile communication device is further configured to communicate information of the test and the subject to a cloud network, the cloud network process the information to refine the test results, and the refined test results will send back the subject. In certain embodiments, the mobile communication device is configured to receive a prescription, diagnosis or a recommendation from a medical professional. In certain embodiments, the mobile communication device is configured with hardware and software to capture an image of the sample. In certain embodiments, the mobile communication device is configured with hardware and software to analyze a test location and a control location in image. In certain embodiments, the mobile communication device is configured with hardware and software to compare a value obtained from analysis of the test location to a threshold value that characterizes the rapid diagnostic test.

In certain embodiments of the present disclosure, at least one of the plates comprises a storage site in which assay reagents are stored. In certain embodiments, at least one of the cameras reads a signal from the device. In certain embodiments, the mobile communication device communicates with the remote location via a wifi or cellular network. In certain embodiments, the mobile communication device is a mobile phone.

In certain embodiments of the present disclosure, a method for rapidly analyzing an analyte in a sample using a mobile phone can comprise depositing a sample on the device of any prior system embodiment. In certain embodiments of the present disclosure, a method for rapidly analyzing an analyte in a sample using a mobile phone can comprise assaying an analyte in the sample deposited on the device to generate a result. In certain embodiments of the present disclosure, a method for rapidly analyzing an analyte in a sample using a mobile phone can comprise communicating the result from the mobile communication device to a location remote from the mobile communication device.

In certain embodiments, the analyte comprises a molecule (e.g., a protein, peptides, DNA, RNA, nucleic acid, or other molecule), cells, tissues, viruses, and nanoparticles with different shapes. In certain embodiments, the analyte comprises white blood cell, red blood cell and platelets. In certain embodiments, the assaying comprises performing a white blood cells differential assay. In certain embodiments, a method of the present disclosure can comprise analyzing the results at the remote location to provide an analyzed result. In certain embodiments, a method of the present disclosure can comprise communicating the analyzed result from the remote location to the mobile communication device. In certain embodiments, the analysis is done by a medical professional at a remote location. In certain embodiments, the mobile communication device receives a prescription, diagnosis or a recommendation from a medical professional at a remote location.

In certain embodiments, the sample is a bodily fluid. In certain embodiments, the bodily fluid is blood, saliva or urine. In certain embodiments, the sample is whole blood without dilution by a liquid. In certain embodiments, the assaying step comprises detecting an analyte in the sample. In certain embodiments, the analyte is a biomarker. In certain embodiments, the analyte is a protein, nucleic acid, cell, or metabolite. In certain embodiments, the method comprises counting the number of red blood cells. In certain embodiments, the method comprises counting the number of white blood cells. In certain embodiments, the method comprises staining the cells in the sample and counting the number of neutrophils, lymphocytes, monocytes, eosinophils and basophils. In certain embodiments, the assay done in step (b) is a binding assay or a biochemical assay.

In certain embodiments of the present disclosure, a method for analyzing a sample can comprise obtaining a device of any prior device embodiment. In certain embodiments of the present disclosure, a method for analyzing a sample can comprise depositing the sample onto one or both pates of the device. In certain embodiments of the present disclosure, a method for analyzing a sample can comprise placing the plates in a closed configuration and applying an external force over at least part of the plates. In certain embodiments of the present disclosure, a method for analyzing a sample can comprise analyzing the layer of uniform thickness while the plates are the closed configuration.

In certain embodiments, the first plate further comprises, on its surface, a first predetermined assay site and a second predetermined assay site, wherein the distance between the edges of the assay site is substantially larger than the thickness of the uniform thickness layer when the plates are in the closed position, wherein at least a part of the uniform thickness layer is over the predetermined assay sites, and wherein the sample has one or a plurality of analytes that are capable of diffusing in the sample. In certain embodiments, the first plate has, on its surface, at least three analyte assay sites, and the distance between the edges of any two neighboring assay sites is substantially larger than the thickness of the uniform thickness layer when the plates are in the closed position, wherein at least a part of the uniform thickness layer is over the assay sites, and wherein the sample has one or a plurality of analytes that are capable of diffusing in the sample. In certain embodiments, the first plate has, on its surface, at least two neighboring analyte assay sites that are not separated by a distance that is substantially larger than the thickness of the uniform thickness layer when the plates are in the closed position, wherein at least a part of the uniform thickness layer is over the assay sites, and wherein the sample has one or a plurality of analytes that are capable of diffusing in the sample. In certain embodiments, the analyte assay area is between a pair of electrodes. In certain embodiments, the assay area is defined by a patch of dried reagent. In certain embodiments, the assay area binds to and immobilizes the analyte. In certain embodiments, the assay area is defined by a patch of binding reagent that, upon contacting the sample, dissolves into the sample, diffuses in the sample, and binds to the analyte. In certain embodiments, the inter-spacer distance is in the range of 14 µm to 200 µm. In certain embodiments, the inter-spacer distance is in the range of 7 µm to 20 µm. In certain embodiments, the spacers are pillars with a cross-sectional shape selected from round, polygonal, circular, square, rectangular, oval, elliptical, or any combination of the same. In certain embodiments, the spacers have a pillar shape and have a substantially flat top surface, wherein, for each spacer, the ratio of the lateral dimension of the spacer to its height is at least 1. In certain embodiments, the spacers have a pillar shape, and the sidewall corners of the spacers have a round shape with a radius of curvature at least 1 µm. In certain embodiments, the spacers have a density of at least $1000/mm^2$. In certain embodiments, at least one of the plates is transparent. In certain embodiments, at least one of the plates is made from a flexible polymer. In certain embodiments, only one of the plates is flexible. In certain embodiments, the area-determination device is a camera. In certain embodiments, an area in the sample contact area of a plate, wherein the area is less than $1/100$, $1/20$, $1/10$, $1/6$, $1/5$, $1/4$, $1/3$, $1/2$, $2/3$ of the sample contact area, or in a range between any of the two values. In certain embodiments, the area-determination device comprises a camera and an area in the sample contact area of a plate, wherein the area is in contact with the sample.

In certain embodiments, the deformable sample comprises a liquid sample. In certain embodiments, the imprecision force has a variation at least 30% of the total force that actually is applied. In certain embodiments, the imprecision force has a variation at least 20%, 30%, 40%, 50%, 60, 70%, 80%, 90% 100%, 150%, 200%, 300%, 500%, or in a range of any two values, of the total force that actually is applied. In certain embodiments, the spacers have a flat top. In certain embodiments, the device is further configured to have, after the pressing force is removed, a sample thickness that is substantially the same in thickness and uniformity as that when the force is applied. In certain embodiments, the imprecise force is provided by human hand. In certain embodiments, the inter spacer distance is substantially constant. In certain embodiments, the inter spacer distance is substantially periodic in the area of the uniform sample thickness area. In certain embodiments, the multiplication product of the filling factor and the Young's modulus of the spacer is 2 MPa or larger. In certain embodiments, the force is applied by hand directly or indirectly. In certain embodiments, the force applied is in the range of 1 N to 20 N. In certain embodiments, the force applied is in the range of 20 N to 200 N. In certain embodiments, the highly uniform layer has a thickness that varies by less than 15%, 10%, or 5% of an average thickness. In certain embodiments, the imprecise force is applied by pinching the device between a thumb and forefinger. In certain embodiments, the predetermined sample thickness is larger than the spacer height. In certain embodiments, the device holds itself in the closed configuration after the pressing force has been removed. In certain embodiments, the uniform thickness sample layer area is larger than that area upon which the pressing force is applied. In certain embodiments, the spacers do not significantly deform during application of the pressing force. In certain embodiments, the pressing force is not predetermined beforehand and is not measured. In certain embodiments, the fluidic sample is replaced by a deformable sample and the embodiments for making at least a part of the fluidic sample into a uniform thickness layer can make at least a part of the deformable sample into a uniform thickness layer. In certain embodiments, the inter spacer distance is periodic. In certain embodiments, the spacers have a flat top. In certain embodiments, the inter spacer distance is at least two times large than the size of the targeted analyte in the sample.

Manufacturing of Q-Card

In certain embodiments of the present disclosure, a Q-Card can comprise a first plate. In certain embodiments of the present disclosure, a Q-Card can comprise a second plate. In certain embodiments of the present disclosure, a Q-Card can comprise a hinge. In certain embodiments, the first plate, that is about 200 nm to 1500 nm thick, comprises, on its inner surface, (a) a sample contact area for contacting a sample, and (b) a sample overflow dam that surrounds the sample contact area is configured to present a sample flow outside of the dam. In certain embodiments, the second plate is 10 um to 250 um thick and comprises, on its inner surface, (a) a sample contact area for contacting a sample, and (b) spacers on the sample contact area. In certain embodiments, the hinge that connect the first and the second plates. In certain embodiments, the first and second plate are movable relative to each other around the axis of the hinge.

In certain embodiments of the present disclosure, an embodiment of the Q-Card can comprise a first plate. In certain embodiments of the present disclosure, an embodiment of the Q-Card can comprise a second plate. In certain embodiments of the present disclosure, an embodiment of the Q-Card can comprise a hinge. In certain embodiments, the first plate, that is about 200 nm to 1500 nm thick, comprises, on its inner surface, (a) a sample contact area for contacting a sample, (b) a sample overflow dam that surrounds the sample contact area is configured to present a sample flow outside of the dam, and (c) spacers on the sample contact area. In certain embodiments, the second plate, that is 10 um to 250 um thick, comprises, on its inner surface, a sample contact area for contacting a sample. In certain embodiments, the hinge connects the first and the second plates. In certain embodiments, the first and second plate are movable relative to each other around the axis of the hinge.

In certain embodiments of the present disclosure, an embodiment of the Q-Card can comprise a first plate. In certain embodiments of the present disclosure, an embodiment of the Q-Card can comprise a second plate. In certain embodiments of the present disclosure, an embodiment of the Q-Card can comprise a hinge. In certain embodiments, the first plate, that is about 200 nm to 1500 nm thick, comprises, on its inner surface, (a) a sample contact area for contacting a sample, and (b) spacers on the sample contact area. In certain embodiments, the second plate, that is 10 um to 250 um thick, comprises, on its inner surface, (a) a sample contact area for contacting a sample, and (b) a sample overflow dam that surrounds the sample contact area is configured to present a sample flow outside of the dam. In certain embodiments, the hinge connects the first and the second plates. In certain embodiments, the first and second plate are movable relative to each other around the axis of the hinge.

In certain embodiments of the present disclosure, an embodiment of the Q-Card can comprise a first plate. In certain embodiments of the present disclosure, an embodiment of the Q-Card can comprise a second plate. In certain embodiments of the present disclosure, an embodiment of the Q-Card can comprise a hinge. In certain embodiments, the first plate, that is about 200 nm to 1500 nm thick, comprises, on its inner surface, a sample contact area for contacting a sample. In certain embodiments, the second plate, that is 10 um to 250 um thick, comprises, on its inner surface, (a) a sample contact area for contacting a sample, (b) a sample overflow dam that surrounds the sample contact area is configured to present a sample flow outside of the dam, and (c) spacers on the sample contact area. In certain embodiments, the hinge connects the first and the second plates. In certain embodiments, the first and second plate are movable relative to each other around the axis of the hinge.

In certain embodiments of the present disclosure, a method for fabricating any Q-Card of the present disclosure can comprise injection molding of the first plate. In certain embodiments of the present disclosure, a method for fabricating any Q-Card of the present disclosure can comprise nanoimprinting or extrusion printing of the second plate.

In certain embodiments of the present disclosure, a method for fabricating any Q-Card of the present disclosure can comprise Laser cutting the first plate. In certain embodiments of the present disclosure, a method for fabricating any Q-Card of the present disclosure can comprise nanoimprinting or extrusion printing of the second plate.

In certain embodiments of the present disclosure, a method for fabricating any Q-Card of the present disclosure can comprise injection molding and laser cutting the first plate. In certain embodiments of the present disclosure, a method for fabricating any Q-Card of the present disclosure can comprise nanoimprinting or extrusion printing of the second plate.

In certain embodiments of the present disclosure, a method for fabricating any Q-Card of the present disclosure can comprise nanoimprinting or extrusion printing to fabricated both the first and the second plate.

In certain embodiments of the present disclosure, a method for fabricating any Q-Card of the present disclosure can comprise fabricating the first plate or the second plate, using injection molding, laser cutting the first plate, nanoimprinting, extrusion printing, or a combination of thereof.

In certain embodiments of the present disclosure, a method for fabricating any Q-Card of the present disclosure can comprise a step of attaching the hinge on the first and the second plates after the fabrication of the first and second plates.

Compressed Regulated Open Flow" (CROF)

In assaying, a manipulation of a sample or a reagent can lead to improvements in the assaying. The manipulation includes, but not limited to, manipulating the geometric shape and location of a sample and/or a reagent, a mixing or a binding of a sample and a reagent, and a contact area of a sample of reagent to a plate.

Many embodiments of the present disclosure manipulate the geometric size, location, contact areas, and mixing of a sample and/or a reagent using a method, termed "compressed regulated open flow (CROF)", and a device that performs CROF.

The term "compressed open flow (COF)" refers to a method that changes the shape of a flowable sample deposited on a plate by (i) placing other plate on top of at least a part of the sample and (ii) then compressing the sample between two plates by pushing the two plates towards each other; wherein the compression reduces a thickness of at least a part of the sample and makes the sample flow into open spaces between the plates.

The term "compressed regulated open flow" or "CROF" (or "self-calibrated compressed open flow" or "SCOF" or "SCCOF") refers to a particular type of COF, wherein the final thickness of a part or entire sample after the compression is "regulated" by spacers, wherein the spacers, that are placed between the two plates.

The term "the final thickness of a part or entire sample is regulated by spacers" in a CROF Additional Notes Further examples of inventive subject matter according to the present disclosure are described in the following enumerated paragraphs.

It must be noted that as used herein and in the appended claims, the singular forms "a", "an", and "the" include plural referents unless the context clearly dictates otherwise, e.g., when the word "single" is used. For example, reference to "an analyte" includes a single analyte and multiple analytes, reference to "a capture agent" includes a single capture agent and multiple capture agents, reference to "a detection agent" includes a single detection agent and multiple detection agents, and reference to "an agent" includes a single agent and multiple agents.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function. Similarly, subject matter that is recited as being configured to perform a particular function may additionally or alternatively be described as being operative to perform that function.

As used herein, the phrase, "for example," the phrase, "as an example," and/or simply the terms "example" and "exemplary" when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, the phrases "at least one of" and "one or more of," in reference to a list of more than one entity, means any one or more of the entities in the list of entities, and is not limited to at least one of each and every entity specifically listed within the list of entity. For example, "at least one of A and B" (or, equivalently, "at least one of A or B," or, equivalently, "at least one of A and/or B") may refer to A alone, B alone, or the combination of A and B.

As used herein, the term "and/or" placed between a first entity and a second entity means one of (1) the first entity, (2) the second entity, and (3) the first entity and the second entity. Multiple entity listed with "and/or" should be construed in the same manner, i.e., "one or more" of the entity so conjoined. Other entity may optionally be present other than the entity specifically identified by the "and/or" clause, whether related or unrelated to those entities specifically identified.

Where numerical ranges are mentioned herein, the disclosure includes embodiments in which the endpoints are included, embodiments in which both endpoints are excluded, and embodiments in which one endpoint is included and the other is excluded. It should be assumed that both endpoints are included unless indicated otherwise. Furthermore, unless otherwise indicated or otherwise evident from the context and understanding of one of ordinary skill in the art.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As will be apparent to those of skill in the art upon reading this disclosure, each of the individual embodiments described and illustrated herein has discrete components and features which can be readily separated from or combined with the features of any of the other several embodiments without departing from the scope or spirit of the present teachings. Any recited method can be carried out in the order of events recited or in any other order which is logically possible.

One with skill in the art will appreciate that the present disclosure is not limited in its application to the details of construction, the arrangements of components, category selections, weightings, pre-determined signal limits, or the steps set forth in the description or drawings herein. The invention is capable of other embodiments and of being practiced or being carried out in many different ways.

The practice of various embodiments of the present disclosure employs, unless otherwise indicated, conventional techniques of immunology, biochemistry, chemistry, molecular biology, microbiology, cell biology, genomics and recombinant DNA, which are within the skill of the art. See Green and Sambrook, MOLECULAR CLONING: A LABORATORY MANUAL, 4th edition (2012); CURRENT PROTOCOLS IN MOLECULAR BIOLOGY (F. M. Ausubel, et al. eds., (1987)); the series METHODS IN ENZYMOLOGY (Academic Press, Inc.): PCR 2: A PRACTICAL APPROACH (M. J. MacPherson, B. D. Hames and G. R. Taylor eds. (1995)), Harlow and Lane, eds. (1988) ANTIBODIES, A LABORATORY MANUAL, and ANIMAL CELL CULTURE (R. I. Freshney, ed. (1987)).

Additional Examples

The present disclosure includes a variety of embodiments, which can be combined in multiple ways as long as the various components do not contradict one another. The embodiments should be regarded as a single invention file: each filing has other filing as the references and is also referenced in its entirety and for all purpose, rather than as a discrete independent. These embodiments include not only the disclosures in the current file, but also the documents that are herein referenced, incorporated, or to which priority is claimed.

(1) Definitions

The terms used in describing the devices/apparatus, systems, and methods herein disclosed are defined in the current application, or in PCT Application (designating U.S.) Nos. PCT/US2016/045437 and PCT/US0216/051775, which were respectively filed on Aug. 10, 2016 and Sep. 14, 2016, U.S. Provisional Application No. 62/456,065, which was filed on Feb. 7, 2017, U.S. Provisional Application No. 62/456,287, which was filed on Feb. 8, 2017, and U.S.

Provisional Application No. 62/456,504, which was filed on Feb. 8, 2017, all of which applications are incorporated herein in their entireties for all purposes.

The terms "CROF Card (or card)", "COF Card", "QMAX-Card", "Q-Card", "CROF device", "COF device", "QMAX-device", "CROF plates", "COF plates", and "QMAX-plates" are interchangeable, except that In certain embodiments, the COF card does not comprise spacers; and the terms refer to a device that comprises a first plate and a second plate that are movable relative to each other into different configurations (including an open configuration and a closed configuration), and that comprises spacers (except certain embodiments of the COF card) that regulate the spacing between the plates. The term "X-plate" refers to one of the two plates in a CROF card, wherein the spacers are fixed to this plate. More descriptions of the COF Card, CROF Card, and X-plate are given in the provisional application Ser. No. 62/456,065, filed on Feb. 7, 2017, which is incorporated herein in its entirety for all purposes.

(2) Sample

The devices/apparatus, systems, and methods herein disclosed can be applied to manipulation and detection of various types of samples. The samples are herein disclosed, listed, described, and/or summarized in PCT Application (designating U.S.) Nos. PCT/US2016/045437 and PCT/US0216/051775, which were respectively filed on Aug. 10, 2016 and Sep. 14, 2016, U.S. Provisional Application No. 62/456,065, which was filed on Feb. 7, 2017, U.S. Provisional Application No. 62/456,287, which was filed on Feb. 8, 2017, and U.S. Provisional Application No. 62/456,504, which was filed on Feb. 8, 2017, all of which applications are incorporated herein in their entireties for all purposes.

The devices, apparatus, systems, and methods herein disclosed can be used for samples such as but not limited to diagnostic samples, clinical samples, environmental samples and foodstuff samples. The types of sample include but are not limited to the samples listed, described and/or summarized in PCT Application (designating U.S.) Nos. PCT/US2016/045437 and PCT/US0216/051775, which were respectively filed on Aug. 10, 2016 and Sep. 14, 2016, and are hereby incorporated by reference by their entireties.

For example, In certain embodiments, the devices, apparatus, systems, and methods herein disclosed are used for a sample that includes cells, tissues, bodily fluids and/or a mixture thereof. In certain embodiments, the sample comprises a human body fluid. In certain embodiments, the sample comprises at least one of cells, tissues, bodily fluids, stool, amniotic fluid, aqueous humour, vitreous humour, blood, whole blood, fractionated blood, plasma, serum, breast milk, cerebrospinal fluid, cerumen, chyle, chime, endolymph, perilymph, feces, gastric acid, gastric juice, lymph, mucus, nasal drainage, phlegm, pericardial fluid, peritoneal fluid, pleural fluid, pus, rheum, saliva, sebum, semen, sputum, sweat, synovial fluid, tears, vomit, urine, and exhaled breath condensate.

In certain embodiments, the devices, apparatus, systems, and methods herein disclosed are used for an environmental sample that is obtained from any suitable source, such as but not limited to: river, lake, pond, ocean, glaciers, icebergs, rain, snow, sewage, reservoirs, tap water, drinking water, etc.; solid samples from soil, compost, sand, rocks, concrete, wood, brick, sewage, etc.; and gaseous samples from the air, underwater heat vents, industrial exhaust, vehicular exhaust, etc. In certain embodiments, the environmental sample is fresh from the source; in certain embodiments, the environmental sample is processed. For example, samples that are not in liquid form are converted to liquid form before the subject devices, apparatus, systems, and methods are applied.

In certain embodiments, the devices, apparatus, systems, and methods herein disclosed are used for a foodstuff sample, which is suitable or has the potential to become suitable for animal consumption, e.g., human consumption. In certain embodiments, a foodstuff sample includes raw ingredients, cooked or processed food, plant and animal sources of food, preprocessed food as well as partially or fully processed food, etc. In certain embodiments, samples that are not in liquid form are converted to liquid form before the subject devices, apparatus, systems, and methods are applied.

In certain embodiments, the QMAX device comprises a hinge that connect two or more plates together, so that the plates can open and close in a similar fashion as a book. In certain embodiments, the material of the hinge is such that the hinge can self-maintain the angle between the plates after adjustment. In certain embodiments, the hinge is configured to maintain the QMAX card in the closed configuration, such that the entire QMAX card can be slide in and slide out a card slot without causing accidental separation of the two plates. In certain embodiments, the QMAX device comprises one or more hinges that can control the rotation of more than two plates.

In essence, the term "spacers" or "stoppers" refers to, unless stated otherwise, the mechanical objects that set, when being placed between two plates, a limit on the minimum spacing between the two plates that can be reached when compressing the two plates together. Namely, in the compressing, the spacers will stop the relative movement of the two plates to prevent the plate spacing becoming less than a preset (i.e. predetermined) value.

The term "a spacer has a predetermined height" and "spacers have a predetermined inter-spacer distance" means, respectively, that the value of the spacer height and the inter spacer distance is known prior to a QMAX process. It is not predetermined, if the value of the spacer height and the inter-spacer distance is not known prior to a QMAX process. For example, in the case that beads are sprayed on a plate as spacers, where beads are landed at random locations of the plate, the inter-spacer distance is not predetermined. Another example of not predetermined inter spacer distance is that the spacers moves during a QMAX processes.

(3) Hinges, Opening Notches, Recessed Edge and Sliders

The devices/apparatus, systems, and methods herein disclosed can include or use Q-cards for sample detection, analysis, and quantification. In certain embodiments, the Q-card comprises hinges, notches, recesses, and sliders, which help to facilitate the manipulation of the Q card and the measurement of the samples. The structure, material, function, variation and dimension of the hinges, notches, recesses, and sliders are herein disclosed, listed, described, and/or summarized in PCT Application (designating U.S.) Nos. PCT/US2016/045437 and PCT/US0216/051775, which were respectively filed on Aug. 10, 2016 and Sep. 14, 2016, U.S. Provisional Application No. 62/431,639, which was filed on Dec. 9, 2016, U.S. Provisional Application No. 62/456,065, which was filed on Feb. 7, 2017, US Provisional Application Nos. 62/456,287 and 62/456,504, which was filed on Feb. 8, 2017, and U.S. Provisional Application No.

62/539,660, which was filed on Aug. 1, 2017, all of which applications are incorporated herein in their entireties for all purposes.

In certain embodiments, the QMAX device comprises opening mechanisms such as but not limited to notches on plate edges or strips attached to the plates, making is easier for a user to manipulate the positioning of the plates, such as but not limited to separating the plates of by hand.

In certain embodiments, the QMAX device comprises trenches on one or both of the plates. In certain embodiments, the trenches limit the flow of the sample on the plate.

(4) Q-Card and Adaptor

The devices/apparatus, systems, and methods herein disclosed can include or use Q-cards for sample detection, analysis, and quantification. In certain embodiments, the Q-card is used together with an adaptor that is configured to accommodate the Q-card and connect to a mobile device so that the sample in the Q-card can be imaged, analyzed, and/or measured by the mobile device. The structure, material, function, variation, dimension and connection of the Q-card, the adaptor, and the mobile are herein disclosed, listed, described, and/or summarized in PCT Application (designating U.S.) Nos. PCT/US2016/045437 and PCT/US0216/051775, which were respectively filed on Aug. 10, 2016 and Sep. 14, 2016, U.S. Provisional Application No. 62/456,065, which was filed on Feb. 7, 2017, U.S. Provisional Application Nos. 62/456,287 and 62/456,590, which were filed on Feb. 8, 2017, U.S. Provisional Application No. 62/456,504, which was filed on Feb. 8, 2017, U.S. Provisional Application No. 62/459,544, which was filed on Feb. 15, 2017, and U.S. Provisional Application Nos. 62/460,075 and 62/459,920, which were filed on Feb. 16, 2017, all of which applications are incorporated herein in their entireties for all purposes.

In certain embodiments, the adaptor comprises a receptacle slot, which is configured to accommodate the QMAX device when the device is in a closed configuration. In certain embodiments, the QMAX device has a sample deposited therein and the adaptor can be connected to a mobile device (e.g. a smartphone) so that the sample can be read by the mobile device. In certain embodiments, the mobile device can detect and/or analyze a signal from the sample. In certain embodiments, the mobile device can capture images of the sample when the sample is in the QMAX device and positioned in the field of view (FOV) of a camera, which in certain embodiments, is part of the mobile device.

In certain embodiments, the adaptor comprises optical components, which are configured to enhance, magnify, and/or optimize the production of the signal from the sample. In certain embodiments, the optical components include parts that are configured to enhance, magnify, and/or optimize illumination provided to the sample. In certain embodiments, the illumination is provided by a light source that is part of the mobile device. In certain embodiments, the optical components include parts that are configured to enhance, magnify, and/or optimize a signal from the sample.

(5) Smartphone Detection System

The devices/apparatus, systems, and methods herein disclosed can include or use Q-cards for sample detection, analysis, and quantification. In certain embodiments, the Q-card is used together with an adaptor that can connect the Q-card with a smartphone detection system. In certain embodiments, the smartphone comprises a camera and/or an illumination source. The smartphone detection system, as well the associated hardware and software are herein disclosed, listed, described, and/or summarized in PCT Application (designating U.S.) Nos. PCT/US2016/045437 and PCT/US0216/051775, which were respectively filed on Aug. 10, 2016 and Sep. 14, 2016, U.S. Provisional Application No. 62/456,065, which was filed on Feb. 7, 2017, U.S. Provisional Application Nos. 62/456,287 and 62/456,590, which were filed on Feb. 8, 2017, U.S. Provisional Application No. 62/456,504, which was filed on Feb. 8, 2017, U.S. Provisional Application No. 62/459,544, which was filed on Feb. 15, 2017, and U.S. Provisional Application Nos. 62/460,075 and 62/459,920, which were filed on Feb. 16, 2017, all of which applications are incorporated herein in their entireties for all purposes.

In certain embodiments, the smartphone comprises a camera, which can be used to capture images or the sample when the sample is positioned in the field of view of the camera (e.g. by an adaptor). In certain embodiments, the camera includes one set of lenses (e.g. as in iPhone™ 6). In certain embodiments, the camera includes at least two sets of lenses (e.g. as in iPhone™ 7). In certain embodiments, the smartphone comprises a camera, but the camera is not used for image capturing.

In certain embodiments, the smartphone comprises a light source such as but not limited to LED (light emitting diode). In certain embodiments, the light source is used to provide illumination to the sample when the sample is positioned in the field of view of the camera (e.g. by an adaptor). In certain embodiments, the light from the light source is enhanced, magnified, altered, and/or optimized by optical components of the adaptor.

In certain embodiments, the smartphone comprises a processor that is configured to process the information from the sample. The smartphone includes software instructions that, when executed by the processor, can enhance, magnify, and/or optimize the signals (e.g. images) from the sample. The processor can include one or more hardware components, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

In certain embodiments, the smartphone comprises a communication unit, which is configured and/or used to transmit data and/or images related to the sample to another device. Merely by way of example, the communication unit can use a cable network, a wireline network, an optical fiber network, a telecommunications network, an intranet, the Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof.

In certain embodiments, the smartphone is an iPhone™, an Android™ phone, or a Windows™ phone.

(6) Detection Methods

The devices/apparatus, systems, and methods herein disclosed can include or be used in various types of detection methods. The detection methods are herein disclosed, listed, described, and/or summarized in PCT Application (designating U.S.) Nos. PCT/US2016/045437 and PCT/US0216/051775, which were respectively filed on Aug. 10, 2016 and Sep. 14, 2016, U.S. Provisional Application No. 62/456,065, which was filed on Feb. 7, 2017, U.S. Provisional Application Nos. 62/456,287, 62/456,528, 62/456,631, 62/456,522, 62/456,598, 62/456,603, and 62/456,628, which were filed on Feb. 8, 2017, U.S. Provisional Application Nos. 62/459,276, 62/456,904, 62/457,075, and 62/457,009, which were filed on Feb. 9, 2017, and U.S. Provisional Application Nos. 62/459,303, 62/459,337, and 62/459,598, which were filed on Feb. 15, 2017, and U.S. Provisional Application Nos. 62/460,083, 62/460,076, which were filed on Feb. 16, 2017, all of which applications are incorporated herein in their entireties for all purposes.

(7) Labels, Capture Agent and Detection Agent

The devices/apparatus, systems, and methods herein disclosed can employ various types of labels, capture agents, and detection agents that are used for analytes detection. The labels are herein disclosed, listed, described, and/or summarized in PCT Application (designating U.S.) Nos. PCT/US2016/045437 and PCT/US0216/051775, which were respectively filed on Aug. 10, 2016 and Sep. 14, 2016, U.S. Provisional Application No. 62/456,065, which was filed on Feb. 7, 2017, U.S. Provisional Application No. 62/456,287, which was filed on Feb. 8, 2017, and U.S. Provisional Application No. 62/456,504, which was filed on Feb. 8, 2017, all of which applications are incorporated herein in their entireties for all purposes.

In some embodiments In certain embodiments, the label is optically detectable, such as but not limited to a fluorescence label. In some embodiments In certain embodiments, the labels include, but are not limited to, IRDye800CW, Alexa 790, Dylight 800, fluorescein, fluorescein isothiocyanate, succinimidyl esters of carboxyfluorescein, succinimidyl esters of fluorescein, 5-isomer of fluorescein dichlorotriazine, caged carboxyfluorescein-alanine-carboxamide, Oregon Green 488, Oregon Green 514; Lucifer Yellow, acridine Orange, rhodamine, tetramethylrhodamine, Texas Red, propidium iodide, JC-1 (5,5',6,6'-tetrachloro-1,1',3,3'-tetraethylbenzimidazoylcarbocyanine iodide), tetrabromorhodamine 123, rhodamine 6G, TMRM (tetramethyl rhodamine methyl ester), TMRE (tetramethyl rhodamine ethyl ester), tetramethylrosamine, rhodamine B and 4-dimethylaminotetramethylrosamine, green fluorescent protein, blueshifted green fluorescent protein, cyan-shifted green fluorescent protein, red-shifted green fluorescent protein, yellow-shifted green fluorescent protein, 4-acetamido-4'-isothiocyanatostilbene-2,2'disulfonic acid; acridine and derivatives, such as acridine, acridine isothiocyanate; 5-(2'-aminoethyl)aminonaphthalene-1-sulfonic acid (EDANS); 4-amino-N-[3-vinylsulfonyl)phenyl]naphth-alimide-3,5 disulfonate; N-(4-anilino-1-naphthyl)maleimide; anthranilamide; 4,4-difluoro-5-(2-thienyl)-4-bora-3a, 4a diaza-5-indacene-3-propioni-c acid BODIPY; cascade blue; Brilliant Yellow; coumarin and derivatives: coumarin, 7-amino-4-methylcoumarin (AMC, Coumarin 120), 7-amino-4-trifluoromethylcoumarin (Coumarin 151); cyanine dyes; cyanosine; 4',6-diaminidino-2-phenylindole (DAPI); 5',5"-dibromopyrogallol-sulfonaphthalein (Bromopyrogallol Red); 7-diethylamino-3-(4'-isothiocyanatophenyl)-4-methylcoumarin; diethylenetriaamine pentaacetate; 4,4'-diisothiocyanatodihydro-stilbene-2-, 2'-disulfonic acid; 4,4'-diisothiocyanatostilbene-2,2'-disulfonic acid; 5-(dimethylamino] naphthalene-1-sulfonyl chloride (DNS, dansylchloride); 4-dimethylaminophenylazophenyl-4'-isothiocyanate (DABITC); eosin and derivatives: eosin, eosin isothiocyanate, erythrosin and derivatives: erythrosin B, erythrosin, isothiocyanate; ethidium; fluorescein and derivatives: 5-carboxyfluorescein (FAM), 5-(4,6-dichlorotriazin-2-yl)aminofluorescein (DTAF), 2',7'dimethoxy-4'5'-dichloro-6-carboxyfluorescein (JOE), fluorescein, fluorescein isothiocyanate, QFITC, (XRITC); fluorescamine; IR144; 1R1446; Malachite Green isothiocyanate; 4-methylumbelliferoneortho cresolphthalein; nitrotyrosine; pararosaniline; Phenol Red; B-phycoerythrin; o-phthaldialdehyde; pyrene and derivatives: pyrene, pyrene butyrate, succinimidyl 1-pyrene; butyrate quantum dots; Reactive Red 4 (Ciba-cron™ Brilliant Red 3B-A) rhodamine and derivatives: 6-carboxy-X-rhodamine (ROX), 6-carboxyrhodamine (R6G), lissamine rhodamine B sulfonyl chloride rhodamine (Rhod), rhodamine B, rhodamine 123, rhodamine X isothiocyanate, sulforhodamine B, sulforhodamine 101, sulfonyl chloride derivative of sulforhodamine 101 (Texas Red); N,N,N',N'-tetramethyl-6-carboxyrhodamine (TAMRA); tetramethyl rhodamine; tetramethyl hodamine isothiocyanate (TRITC); riboflavin; 5-(2'-aminoethyl) am inonaphthalene-1-sulfonic acid (EDANS), 4-(4'-dimethylaminophenylazo)benzoic acid (DABCYL), rosolic acid; CAL Fluor Orange 560; terbium chelate derivatives; Cy 3; Cy 5; Cy 5.5; Cy 7; IRD 700; IRD 800; La Jolla Blue; phthalo cyanine; and naphthalo cyanine, coumarins and related dyes, xanthene dyes such as rhodols, resorufins, bimanes, acridines, isoindoles, dansyl dyes, aminophthalic hydrazides such as luminol, and isoluminol derivatives, aminophthalimides, aminonaphthalimides, aminobenzofurans, aminoquinolines, dicyanohydroquinones, fluorescent europium and terbium complexes; combinations thereof, and the like. Suitable fluorescent proteins and chromogenic proteins include, but are not limited to, a green fluorescent protein (GFP), including, but not limited to, a GFP derived from Aequoria victoria or a derivative thereof, e.g., a "humanized" derivative such as Enhanced GFP; a GFP from another species such as *Renilla reniformis, Renilla mulleri*, or *Ptilosarcus guernyi*; "humanized" recombinant GFP (hrGFP); any of a variety of fluorescent and colored proteins from Anthozoan species; combinations thereof; and the like.

In any embodiment, the QMAX device can contain a plurality of capture agents and/or detection agents that each bind to a biomarker selected from Tables B1, B2, B3 and/or B7 in U.S. Provisional Application No. 62/234,538 and/or PCT Application No. PCT/US2016/054025, wherein the reading step d) includes obtaining a measure of the amount of the plurality of biomarkers in the sample, and wherein the amount of the plurality of biomarkers in the sample is diagnostic of a disease or condition.

In any embodiment, the capture agent and/or detection agents can be an antibody epitope and the biomarker can be an antibody that binds to the antibody epitope. In some embodiments In certain embodiments, the antibody epitope includes a biomolecule, or a fragment thereof, selected from Tables B4, B5 or B6 in U.S. Provisional Application No. 62/234,538 and/or PCT Application No. PCT/US2016/054025. In some embodiments In certain embodiments, the antibody epitope includes an allergen, or a fragment thereof, selected from Table B5. In some embodiments In certain embodiments, the antibody epitope includes an infectious agent-derived biomolecule, or a fragment thereof, selected from Table B6 in U.S. Provisional Application No. 62/234,538 and/or PCT Application No. PCT/US2016/054025.

In any embodiment, the QMAX device can contain a plurality of antibody epitopes selected from Tables B4, B5 and/or B6 in U.S. Provisional Application No. 62/234,538 and/or PCT Application No. PCT/US2016/054025, wherein the reading step d) includes obtaining a measure of the amount of a plurality of epitope-binding antibodies in the sample, and wherein the amount of the plurality of epitope-binding antibodies in the sample is diagnostic of a disease or condition.

(8) Analytes

The devices/apparatus, systems, and methods herein disclosed can be applied to manipulation and detection of various types of analytes (including biomarkers). The analytes are herein disclosed, listed, described, and/or summarized in PCT Application (designating U.S.) Nos. PCT/US2016/045437 and PCT/US0216/051775, which were respectively filed on Aug. 10, 2016 and Sep. 14, 2016, U.S. Provisional Application No. 62/456,065, which was filed on Feb. 7, 2017, U.S. Provisional Application No. 62/456,287, which was filed on Feb. 8, 2017, and U.S. Provisional Application No. 62/456,504, which was filed on Feb. 8, 2017, all of which applications are incorporated herein in their entireties for all purposes.

The devices, apparatus, systems, and methods herein disclosed can be used for the detection, purification and/or quantification of various analytes. In certain embodiments, the analytes are biomarkers that associated with various diseases. In certain embodiments, the analytes and/or biomarkers are indicative of the presence, severity, and/or stage of the diseases. The analytes, biomarkers, and/or diseases that can be detected and/or measured with the devices, apparatus, systems, and/or method of the present disclosure include the analytes, biomarkers, and/or diseases listed, described and/or summarized in PCT Application (designating U.S.) Nos. PCT/US2016/045437 filed on Aug. 10, 2016, and PCT Application No. PCT/US2016/054025 filed on Sep. 27, 2016, and U.S. Provisional Application Nos. 62/234,538 filed on Sep. 29, 2015, 62/233,885 filed on Sep. 28, 2015, 62/293,188 filed on Feb. 9, 2016, and 62/305,123 filed on Mar. 8, 2016, which are all hereby incorporated by reference by their entireties. For example, the devices, apparatus, systems, and methods herein disclosed can be used in (a) the detection, purification and quantification of chemical compounds or biomolecules that correlates with the stage of certain diseases, e.g., infectious and parasitic disease, injuries, cardiovascular disease, cancer, mental disorders, neuropsychiatric disorders and organic diseases, e.g., pulmonary diseases, renal diseases, (b) the detection, purification and quantification of microorganism, e.g., virus, fungus and bacteria from environment, e.g., water, soil, or biological samples, e.g., tissues, bodily fluids, (c) the detection, quantification of chemical compounds or biological samples that pose hazard to food safety or national security, e.g. toxic waste, anthrax, (d) quantification of vital parameters in medical or physiological monitor, e.g., glucose, blood oxygen level, total blood count, (e) the detection and quantification of specific DNA or RNA from biosamples, e.g., cells, viruses, bodily fluids, (f) the sequencing and comparing of genetic sequences in DNA in the chromosomes and mitochondria for genome analysis or (g) to detect reaction products, e.g., during synthesis or purification of pharmaceuticals.

In certain embodiments, the analyte can be a biomarker, an environmental marker, or a foodstuff marker. The sample in some instances is a liquid sample, and can be a diagnostic sample (such as saliva, serum, blood, sputum, urine, sweat, lacrima, semen, or mucus); an environmental sample obtained from a river, ocean, lake, rain, snow, sewage, sewage processing runoff, agricultural runoff, industrial runoff, tap water or drinking water; or a foodstuff sample obtained from tap water, drinking water, prepared food, processed food or raw food.

In any embodiment, the sample can be a diagnostic sample obtained from a subject, the analyte can be a biomarker, and the measured the amount of the analyte in the sample can be diagnostic of a disease or a condition.

In any embodiment, the devices, apparatus, systems, and methods in the present disclosure can further include diagnosing the subject based on information including the measured amount of the biomarker in the sample. In some cases, the diagnosing step includes sending data containing the measured amount of the biomarker to a remote location and receiving a diagnosis based on information including the measurement from the remote location.

(9) Cloud

The devices/apparatus, systems, and methods herein disclosed can employ cloud technology for data transfer, storage, and/or analysis. The related cloud technologies are herein disclosed, listed, described, and/or summarized in PCT Application (designating U.S.) Nos. PCT/US2016/045437 and PCT/US0216/051775, which were respectively filed on Aug. 10, 2016 and Sep. 14, 2016, U.S. Provisional Application No. 62/456,065, which was filed on Feb. 7, 2017, U.S. Provisional Application No. 62/456,287, which was filed on Feb. 8, 2017, and U.S. Provisional Application No. 62/456,504, which was filed on Feb. 8, 2017, all of which applications are incorporated herein in their entireties for all purposes.

In certain embodiments, the cloud storage and computing technologies can involve a cloud database. Merely by way of example, the cloud platform can include a private cloud, a public cloud, a hybrid cloud, a community cloud, a distributed cloud, an inter-cloud, a multi-cloud, or the like, or any combination thereof. In certain embodiments, the mobile device (e.g. smartphone) can be connected to the cloud through any type of network, including a local area network (LAN) or a wide area network (WAN).

In certain embodiments, the data (e.g. images of the sample) related to the sample is sent to the cloud without processing by the mobile device and further analysis can be conducted remotely. In certain embodiments, the data related to the sample is processed by the mobile device and the results are sent to the cloud. In certain embodiments, both the raw data and the results are transmitted to the cloud.

What is claimed is:

1. A device for rapid pH measurement, comprising:
a first plate, a second plate, spacers and a pH indicator, wherein:
(a) the plates are movable relative to each other into different configurations, including an open configuration and a closed configuration;
(b) each of the plates has, on its respective inner surface, a sample contact area for contacting a sample;
(c) one or both of the plates comprise the spacers, at least one of the spacers is inside the sample contact area, and the spacers have a predetermined substantially uniform height; and
(d) one or both of the plates comprise, on the respective inner surface, the pH indicator that, upon contacting the sample, exhibits a color indicative of a pH value of the sample;

wherein, in the open configuration, the two plates are partially or entirely separated apart, the spacing between the first plate and the second plate is not regulated by the spacers, and the sample is deposited on one or both of the plates; and wherein in the closed configuration, which is configured after deposition of the sample in the open configuration: at least part of the sample is compressed by the two plates into a layer of uniform thickness, the layer is confined by the inner surfaces of the plates and has its thickness regulated by the spacers and the plates.

2. A system for rapid pH measurement, comprising:
(a) a device of claim 1; and
(b) a detector that detects the color of the pH indicator in the layer of uniform thickness.

3. A smartphone system for a rapid homogenous assay, comprising:
(a) a device of claim 1;
(b) a mobile communication device that comprises:
  i. one or a plurality of cameras for detecting and/or imaging the sample; and
  ii. electronics, signal processors, hardware and software for receiving and/or processing the detected signal and/or an image of the sample and for remote communication; and
(c) an adaptor that is configured to hold the device in the closed configuration and engageable to the mobile communication device;
wherein when engaged with the mobile communication device, the adaptor is configured to facilitate the detection and/or imaging of the sample when the plates are in the closed configuration.

4. The system of claim 2, further comprising at least one imager that images a part of the sample that is between the two plates when the two plates are in the closed configuration.

5. A device of claim 1, further comprising an algorithm for determining the pH value from images of the at least part of the sample by using artificial intelligence and machine learning.

6. A method for performing a rapid homogenous assay, comprising:
(a) obtaining a sample;
(b) obtaining the device of claim 1;
(c) depositing the sample on one or both of the plates when the plates are in the open configuration;
(d) after (c), bringing the two plates together and pressing the plates into the closed configuration; and
(e) while the plates are in the closed configuration, detecting and analyzing the color of the pH indicator.

7. A method of analyzing an image for a rapid homogenous assay, comprising:
(a) obtaining an image of a signal in the device of claim 1 at the closed configuration, wherein the image is selected from the group consisting of a bright field image, a dark field image, a fluorescence image, and a phosphorescence image;
(b) analyzing the image, wherein the analyzing comprises (i) identifying beads in the image, and (ii) extracting information of a bead size, a signal intensity of one or more beads, a distance between beads, a distribution of beads, and/or a number of beads; and
(c) determining analyte concentration using the extracted information from step (b) and calculating parameters of the beads.

8. A method of performing a homogenous assay, comprising:
(a) obtaining a sample;
(b) obtaining a first plate and a second plate that are movable relative to each other into different configurations, including an open configuration and a closed configuration, wherein:
  i. each of the plates has, on its respective inner surface, a sample contact area for contacting the sample,
  ii. one or both of the plates comprise spacers, and at least one of the spacers is inside the sample contact area; and
  iii. one or both of the plates comprise, on the respective inner surface, a pH indicator that, upon contacting the sample, exhibits color indicative of a pH of the sample;
wherein the spacers have a predetermined substantially uniform height;
(c) depositing the sample on one or both of the plates when the plates are in an open configuration, wherein in the open configuration the two plates are partially or entirely separated apart and the spacing between the plates is not regulated by the spacers;
(d) after (c), bringing the two plates together and pressing the plates into a closed configuration, wherein in the closed configuration: at least part of the sample is compressed by the two plates into a layer of uniform thickness, the uniform thickness of the layer is confined by the inner surfaces of the two plates and is regulated by the spacers and the plates; and
(e) while the plates are at the closed configuration, detecting and analyzing the color of the pH indicator in the layer of uniform thickness.

9. A method comprising:
a. obtaining a sample;
b. obtaining the device of claim 1;
c. depositing the sample on one or both of the plates when the plates are in the open configuration;
d. after (c), bringing the two plates together and pressing the plates into the closed configuration; and
e. while the plates are in the closed configuration, detecting and analyzing at least one of the hue and the saturation of the color of the pH indicator to determine a pH of the sample.

10. A method comprising:
a. obtaining a sample;
b. obtaining the device of claim 1;
c. depositing the sample on one or both of the plates when the plates are in the open configuration;
d. after (c), bringing the two plates together and pressing the plates into the closed configuration; and
e. while the plates are in the closed configuration, detecting and analyzing both of the hue and the saturation of the color of the pH indicator to determine a pH of the sample.

11. The method of claim 6, wherein the analyzing comprises using a correlation between the hue and the saturation to determine the pH of the sample.

12. The method of claim 6, wherein the analyzing comprises calculating the volume of a relevant sample volume as a product of the lateral area of the relevant sample volume and the predetermined spacer height.

13. The method of claim 6, wherein the pH value at a location of the sample that is between the two plates in the closed configuration is determined using the relevant sample volume and by analyzing one or more images taken from the location.

14. The method of claim 6, wherein determining the pH value comprises analyzing an image using artificial intelligence and/or machine learning.

15. The method of claim 7, wherein the image is selected from the group consisting of bright field image, dark field image, fluorescence image, and phosphorescence image.

16. The device of claim 1, wherein the pH indicator is at least one compound selected from the group consisting of Gentian violet (Methyl violet 10B), Malachite green, Thymol blue, Methyl yellow, Bromophenol blue, Congo red, Methyl orange, Methyl Orange-Xylene Cyanol, Screened methyl orange, Bromocresol green, Methyl red, Methyl purple, Azolitmin, Bromocresol purple, Bromothymol blue, Phenol red, Neutral red, Naphtholphthalein, Cresol red, Cresolphthalein, Cresol Purple, Dichlorofluorescein, Phenolphthalein, Thymolphthalein, Alizarine Yellow R, Alizarin Red S, and Indigo carmine.

17. The device of claim 1, wherein the pH indicator comprises Thymol blue, Methyl blue, and Bromothymol blue.

18. The device of claim 1, wherein the pH indicator comprises a mixture of Thymol blue, Methyl blue, and Bromothymol blue in a ratio of 1:2.5:10 by weight.

19. The device of claim 1, wherein one or both of the plates comprise one or more color standards with predetermined color values.

20. The device of claim 1, wherein the pH indicator is substantially uniformly coated on the one or both of the plates.

21. The device of claim 1, wherein the spacers have a pillar shape.

22. The device of claim 1, wherein the spacers have a nearly uniform cross-section.

23. The device of claim 1, wherein the spacers have a substantially flat top surface.

24. The device of claim 1, wherein the spacers have a predetermined constant inter-spacer distance (ISD).

25. The device of claim 24, wherein the predetermined constant inter-spacer distance is at least about 2 times larger than the size of the analyte.

26. The device of claim 1, wherein a Young's modulus of the spacers times a filling factor of the spacers is equal or larger than 2 MPa.

27. The device of claim 24, wherein the constant inter spacer distance (ISD) is equal or less than (i) about 120 um (micrometer) or (ii) about 100 um.

28. The device of claim 24, wherein the fourth power of the inter-spacer distance (ISD) divided by the thickness (h) and the Young's modulus (E) of the plate (ISD^4/(hE)) is (i) 5×10^6 um^3/GPa or less or (ii) 5×10^5 um^3/GPa or less.

29. The device of claim 1, wherein the spacers have a pillar shape, a substantially flat top surface, a predetermined substantially uniform height, and a predetermined constant inter-spacer distance that is at least about 2 times larger than the size of the analyte, wherein the Young's modulus of the spacers times a filling factor of the spacers is equal or larger than 2 MPa, wherein the filling factor is the ratio of the spacer contact area to the total plate area, and wherein, for each spacer, the ratio of the lateral dimension of the spacer to its height is at least 1.

30. The device of claim 1, wherein the ratio of the inter-spacing distance (ISD) of the spacers to the average width of the spacer is 2 or larger, and the filling factor of the spacers multiplied by the Young's modulus of the spacers is 2 MPa or larger.

31. The device of claim 1, wherein the spacers have a shape of pillars and a ratio of the width to the height of the pillar is equal or larger than one.

32. The device of claim 1, wherein the sample comprises at least one selected from the group consisting of cells, tissues, bodily fluids, and stool.

33. The device of claim 1, wherein the sample is the sample in the detection of proteins, peptides, nucleic acids, synthetic compounds, inorganic compounds.

34. The device of claim 1, wherein the sample is the sample in a field selected from the group consisting of human, veterinary, agriculture, foods, environments, and drug testing.

35. The device of claim 1, wherein the sample is a biological sample selected from the group consisting of blood, serum, plasma, a nasal swab, a nasopharyngeal wash, saliva, urine, gastric fluid, spinal fluid, tears, stool, mucus, sweat, earwax, oil, a glandular secretion, cerebral spinal fluid, tissue, semen, vaginal fluid, interstitial fluids derived from tumorous tissue, ocular fluids, spinal fluid, a throat swab, breath, hair, finger nails, skin, biopsy, placental fluid, amniotic fluid, cord blood, lymphatic fluids, cavity fluids, sputum, pus, microbiota, meconium, breast milk, exhaled condensate nasopharyngeal wash, nasal swab, throat swab, stool samples, hair, finger nail, ear wax, breath, connective tissue, muscle tissue, nervous tissue, epithelial tissue, cartilage, cancerous sample, and bone.

* * * * *